Oct. 7, 1969

R. O'LEARY 3,471,629

ELECTRICAL SURFACE RACEWAY WIRING SYSTEM

Filed March 12, 1963

INVENTOR.
RAY O'LEARY

BY

TW Secrest

ATTORNEY

Oct. 7, 1969 R. O'LEARY 3,471,629
ELECTRICAL SURFACE RACEWAY WIRING SYSTEM
Filed March 12, 1963 9 Sheets-Sheet 2

INVENTOR.
RAY O'LEARY
BY
TW Sureat
ATTORNEY

Oct. 7, 1969 R. O'LEARY 3,471,629
ELECTRICAL SURFACE RACEWAY WIRING SYSTEM
Filed March 12, 1963 9 Sheets-Sheet 3

INVENTOR.
RAY O'LEARY
BY
TW Serist
ATTORNEY.

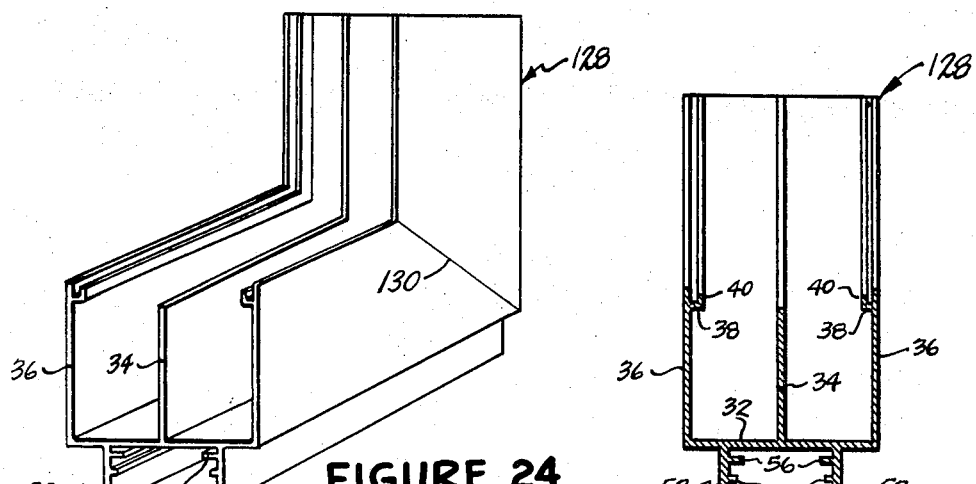
FIGURE 24
FIGURE 25
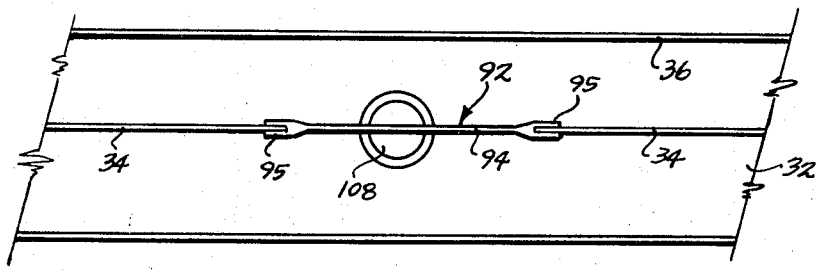
FIGURE 23
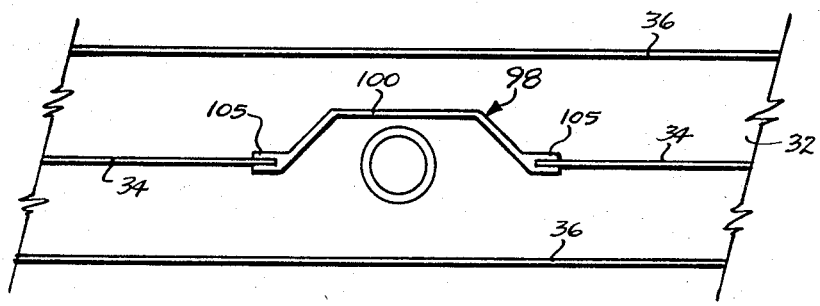
FIGURE 21

RAY O'LEARY - INVENTOR.

BY

TW Secrest

Oct. 7, 1969  R. O'LEARY  3,471,629
ELECTRICAL SURFACE RACEWAY WIRING SYSTEM
Filed March 12, 1963  9 Sheets-Sheet 6

RAY O'LEARY — INVENTOR.

BY T W Secrest

RAY O'LEARY  INVENTOR.

BY

T W Secrest

Oct. 7, 1969     R. O'LEARY     3,471,629

ELECTRICAL SURFACE RACEWAY WIRING SYSTEM

Filed March 12, 1963     9 Sheets-Sheet 8

RAY O'LEARY - INVENTOR.

BY
TW Secrest

Oct. 7, 1969  R. O'LEARY  3,471,629
ELECTRICAL SURFACE RACEWAY WIRING SYSTEM
Filed March 12, 1963  9 Sheets-Sheet 9

RAY O'LEARY  INVENTOR.

BY
TW Secrest

United States Patent Office 3,471,629
Patented Oct. 7, 1969

3,471,629
ELECTRICAL SURFACE RACEWAY WIRING SYSTEM
Ray O'Leary, 1114 NE. Perkins Way,
Seattle, Wash. 98155
Filed Mar. 12, 1963, Ser. No. 264,659
Int. Cl. H02g 3/04, 3/10
U.S. Cl. 174—49                                59 Claims This invention relates to an electrical wiring system whereby it is possible to have at least two sets of electrical conductors in the same container, and which conductors are at different electrical potentials.

The normally acceptable surface raceway wiring systems in the early 1960's do not allow the mixing of high voltage electrical conductors and low voltage electrical conductors. To the best of my knowledge, and prior to my invention, there has not been provided a surface raceway wiring system which allows a high voltage electrical conductor and a low voltage electrical conductor in the same envelope or container. Because of the lack of such a surface raceway wiring system for integrating a high voltage power line and a low voltage communication line in the same enclosure there has resulted the common acceptable practice of installing separate raceway systems for power, communication and signalling circuits. For example, in many office areas there are a multiplicity of desks arranged in a side by side relationship in rows. Power lines and communication lines must be installed to service these desks. The normally accepted practice is to install high voltage power lines which terminate at specified positions. The power lines may run on the floor or may be overhead. From these termination positions there are extensions to electrical equipment such as typewriters, desk lamps, adding machines, calculators and other likened uses. Likewise, the normally accepted practice is to install low voltage communication lines which terminate at specified positions. The communication lines may run on the floor or may be overhead. From these termination positions there are extensions to communication equipment such as telephones and intercommunication appliances. In the installation of the power lines and the communication lines there is created a hazard as cord is used. With the lines on the floor a person walking may trip on the line or may kick the line so as to break the insulation giving rise to a short and possible fire. Also, the problem of maintenance is increased due to mopping, sweeping and polishing of the floors. In the case of conductors being extended from overhead outlets or terminal points strain is encountered on the cords; cord caps fall out of the outlet; a person may brush his head or body against the hanging cord; and, the greatest possible utilization of the system cannot be realized due to the inherent limitations. Further, cords of this type are two conductor cords and are not a grounded type. This presents a definite shock hazard to the user of any appliance connector to such an extension cord. In addition, the maze of extension cords, either on the floor or overhead, detracts from the appearance of the area so served.

From having worked on electrical wiring systems for a number of years, and to the best of my knowledge, there is no electrical spstem in use which allows one electrical wiring system to be at one electrical potential and a second electrical wiring system to be at another electrical potential in the same container or envelope. An illustration of this is the electrical wiring system used for normal power such as 110 volts AC for lighting lights and equipment such as electric typewriters, adding machines and electrical erasers; and also which allows a second electrical system to be at a different potential such as a telephone communication system having voltages ranging from 40 to 55 volts AC. To more fully illustrate this the envelope or container housing the electrical conductors can house both a low voltage system and a high voltage system. The two systems are in the same envelope or container but are separated by an isolation wall. More particularly, in the low voltage system a potential of 85 volts or less may be in one container, such as a telephone system of 40 to 55 volts AC; an inner communication system of 6 to 24 volts AC; and, any other low voltage use. In the high potential side there may be the normally used potential of 110 to 120 volts AC, 220 volts and 440 volts AC, either single phase or three phase.

With this background of the limitations of a system for carrying both high voltage and low voltage electricity I have invented a raceway wiring system, which makes it possible to carry both power and communication wiring in one container; a complete electrical container with safety from accidental grounding, shorts and inadvertent faults; a raceway which complies with the requirements of Underwriters Laboratories and their published standards for raceways; a raceway which is acceptable under the National Electric Code; a raceway which eliminates the need for wire mold, plug mold, conduit systems, and other wiring media; a raceway which has an inherent safety factor in that there is eliminated the use of extension cords for both power and communication from a central faraway location and also the need for stapling the telephone cords to the desks and the like; a raceway which affords flexibility as the raceway may be readily disassembled, the raceway moved and then reassembled; a raceway which is conducive to the adding of power and communication lines and also the deletion of power and communication lines; a raceway which can be both readily installed and rapidly installed with a minimum of labor; a raceway which is a "Lay-In" system for the electrical conductors and visible to the eyes, thereby eliminating the use of a fish tape for pulling the electrical conductors through conduit, electrical metallic tubing or the other commonly used surface raceway wiring methods; a raceway which has a decorative effect and is pleasing to the eye; and, a raceway which is relatively inexpensive from the standpoint of the basic components and also from the standpoint of installation, and relocation of the raceway.

These and other important objects and advantages of the invention will be more particularly brought forth upon reference to the accompanying drawings, a detailed specification of the invention and the claims.

3

Figure 11:
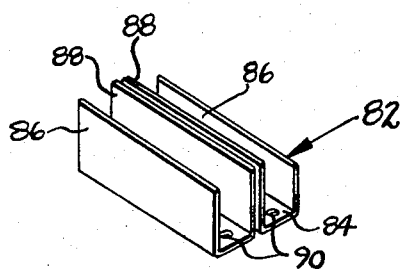
Figure 12:
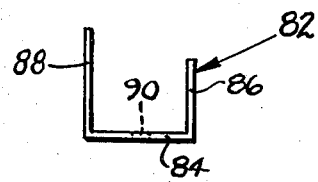
Figure 13:
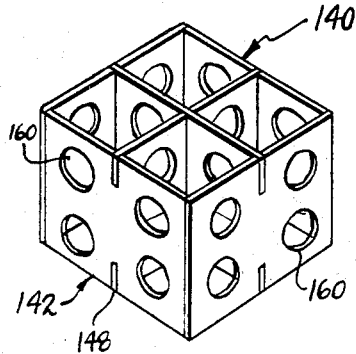
Figure 14:
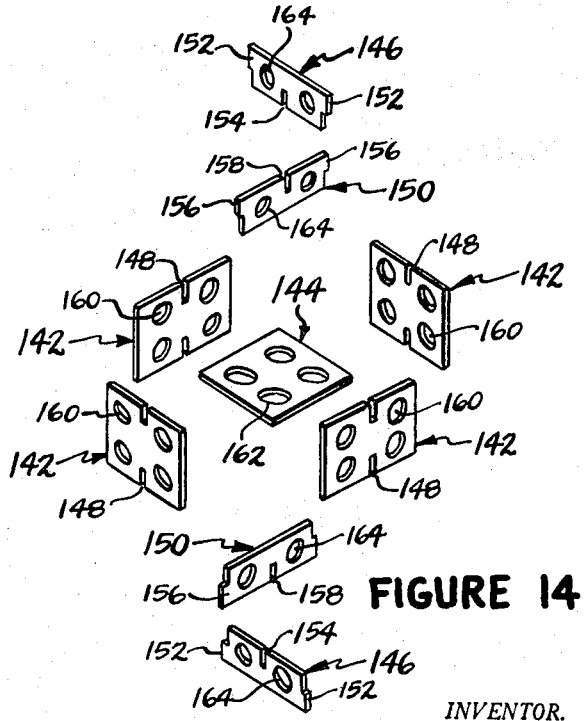
Figure 29:
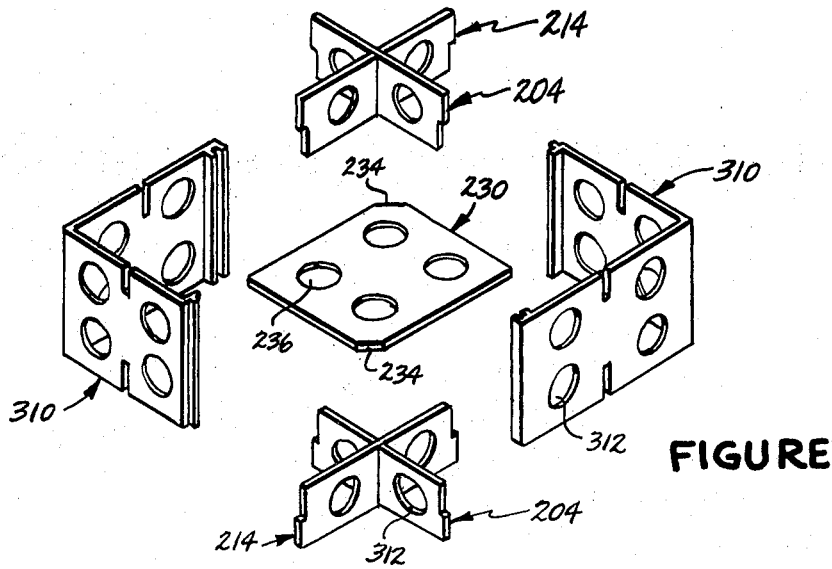
Figure 15:
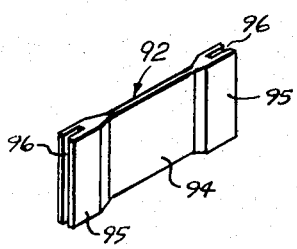
Figure 16:
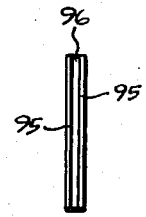
Figure 17:
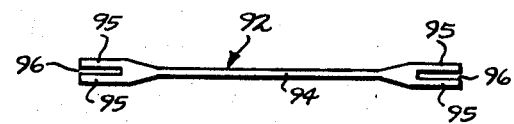
Figure 18:
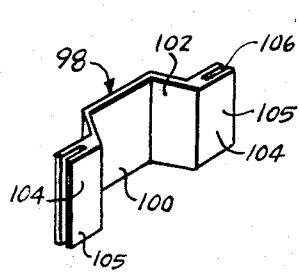
Figures 19, 20:
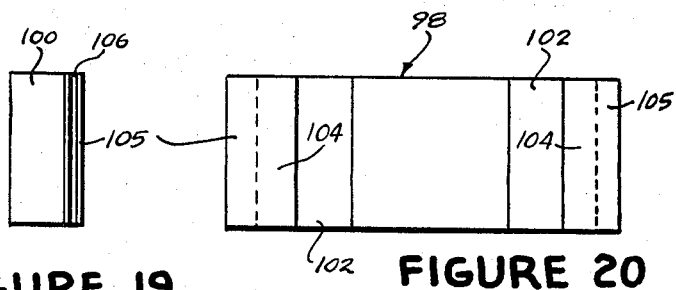
Figure 26:
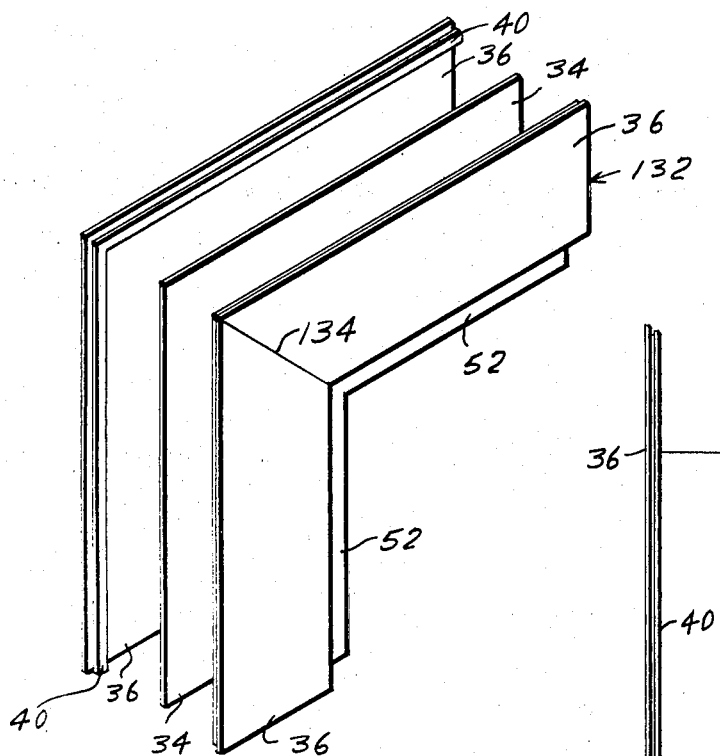
Figure 27:
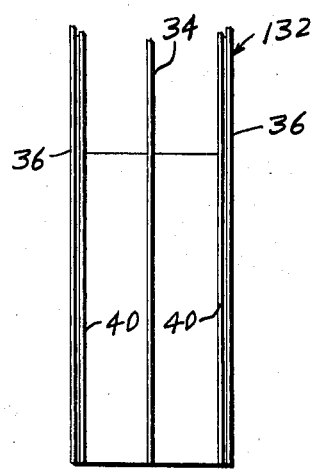
Figure 22:
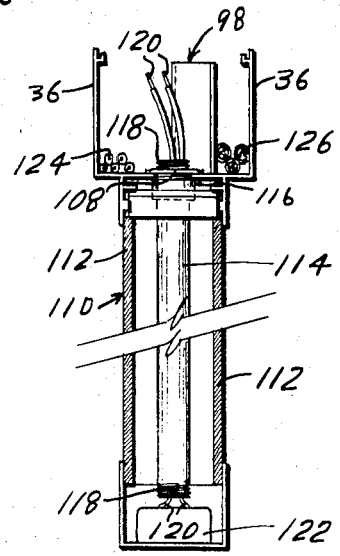
Figure 28:
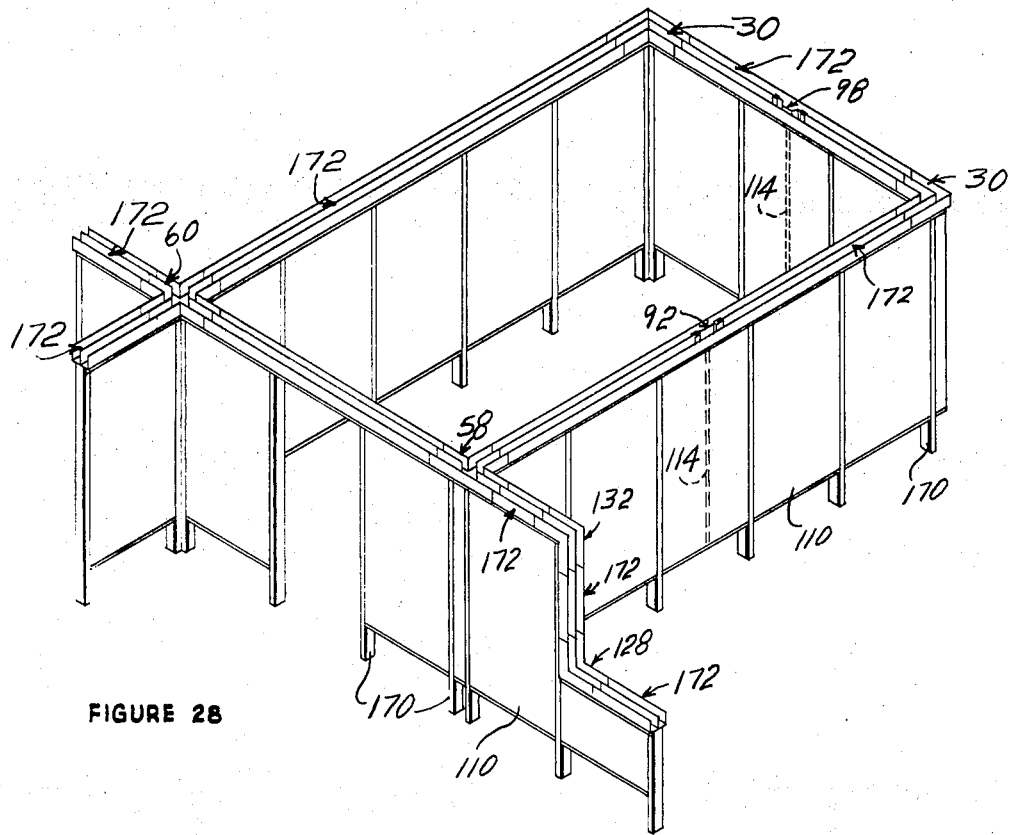
Figure 30:
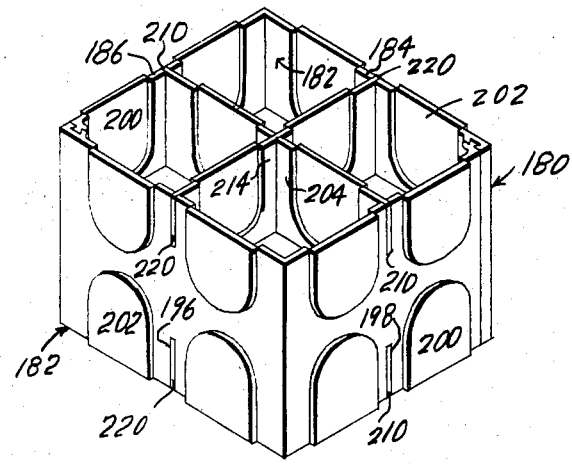
Figure 35:
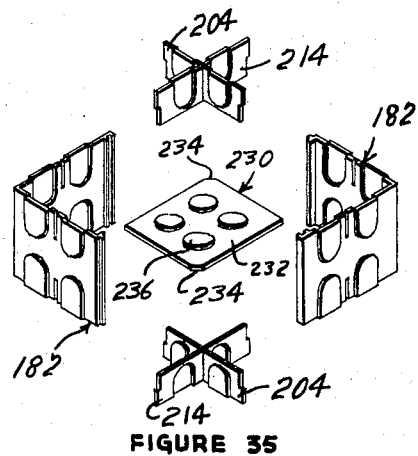
Figure 31:
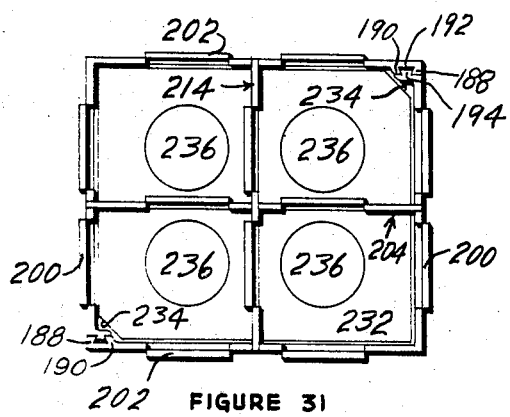
Figure 32:
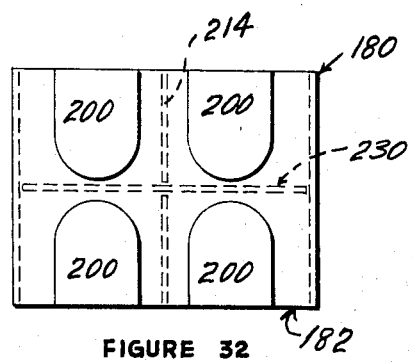
Figure 34:
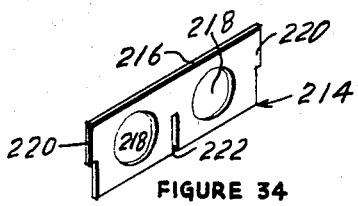
Figure 33:
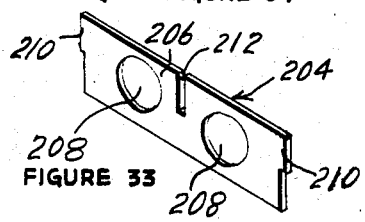
Figure 36:
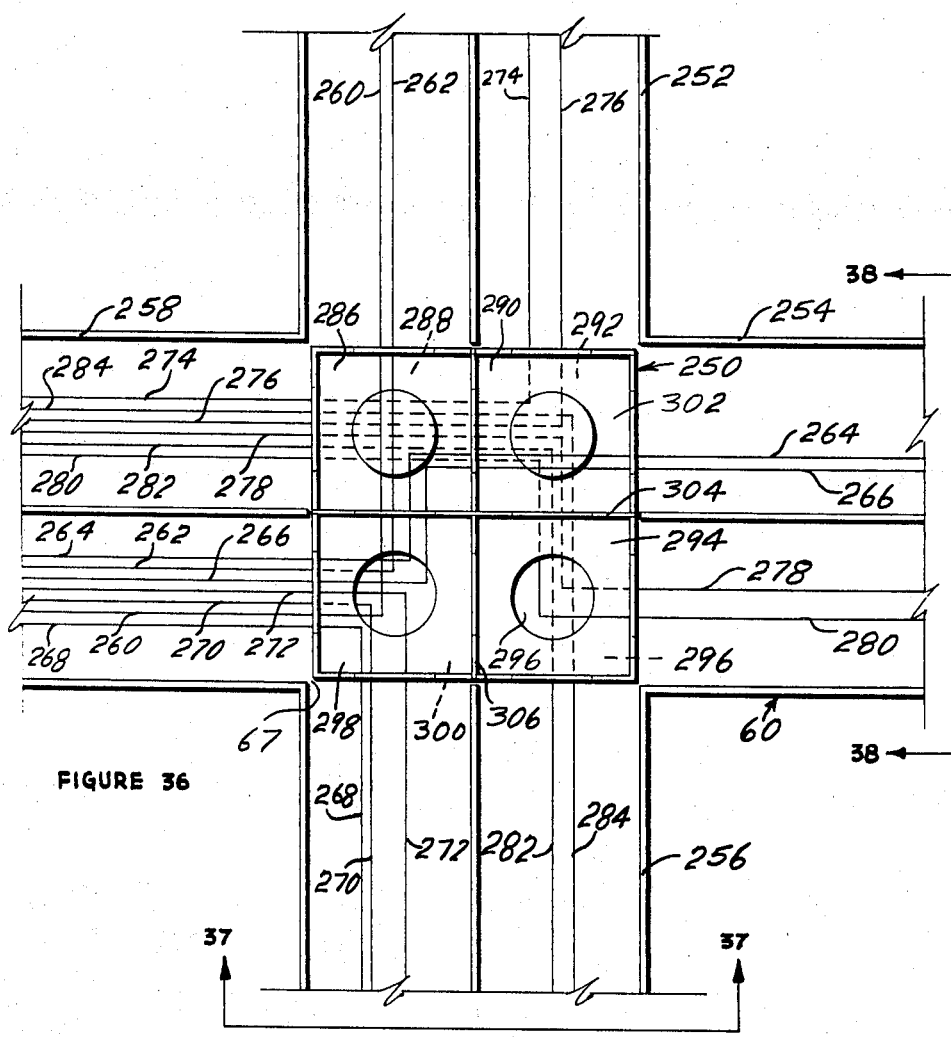

FIGURE 11 is an isometric view of two raceway connectors in a side by side relationship and shows the base, the long leg and the short leg of each connector;

FIGURE 12 is an end view of one raceway connector and shows the base, the long leg and the short leg;

FIGURE 13 is an isometric view looking at the circuit and system voltage separator and illustrates the same as having circular knockouts;

FIGURE 14 is an isometric exploded view of the circuit and system voltage separator of FIGURE 13;

FIGURE 15 is an isometric view of a center fin replacement clip and shows internal slotted sections on the end;

FIGURE 16 is an end view of the center fin replacement clip;

FIGURE 17 is a plan view of the center fin replacement clip;

FIGURE 18 is an isometric view looking at a reversible voltage separator clip and shows internal slotted sections on the ends;

FIGURE 19 is an end elevation view of the reversible voltage separator clip;

FIGURE 20 is a side elevational view of the reversible voltage separator clip;

FIGURE 21 is a plan view looking down on a straight section of the electrical raceway wiring system and shows a discontinuity in the upright interior separator of the section and shows the reversible voltage separator clip positioned in this discontinuity, and shows a knockout for the introduction of a conduit into the electrical raceway;

FIGURE 22 is a side-elevational view illustrating the electrical raceway wiring system on a partition, a reversible voltage separator clip in the electrical raceway, and shows the knockout and a conduit in said partition;

FIGURE 23 is a plan view looking at a straight section of the electrical raceway wiring system and shows a discontinuity in the upright interior separator with a center fin replacement clip to bridge said discontinuity;

FIGURE 24 is an isometric view of an internal L-section and shows the two legs of the same;

FIGURE 25 is an end view looking into the end of one leg of the internal L-section;

FIGURE 26 is an isometric view looking at an external L-section and illustrates the two legs of the same;

FIGURE 27 is an end view looking in the end of one leg of said external L-section and also looking, as in a plan view, into the other leg of said external L-section;

FIGURE 28 is an isometric view looking at a room partitioned by partitions and comprising said electrical raceway wiring system, including the various components, as applied to the wiring of a room enclosed by partitions and capped by the electrical raceway wiring systems;

FIGURE 29 is an isometric exploded view of a circuit system voltage separator and illustrates the same with slide grooves on the edges of the side members;

FIGURE 30 is an isometric view looking down on a circuit and system voltage separator and illustrates the side grooves and the horseshoe type knockouts in the separator;

FIGURE 31 is a plan view looking down on a circuit and system voltage separator and illustrates the knockouts and also the slide members on the side members;

FIGURE 32 is a side elevational view of a circuit and system voltage separator and illustrates the horseshoe type knockouts;

FIGURE 33 is a side elevational view of one type of a divider used in the circuit and system voltage separator;

FIGURE 34 is a side elevational view of another type of a divider used in a circuit and system voltage separator;

FIGURE 35 is an isometric view looking down on the combination of two dividers illustrated in FIGURES 33 and 34;

FIGURE 36 is a plan view looking down on a circuit and system voltage separator positioned in a four-way cross unit and illustrates the arrangement of both power

Figures 39, 40:
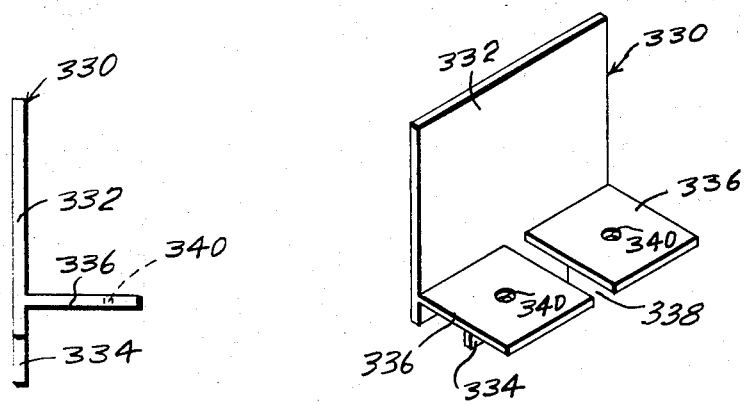
Figure 37:
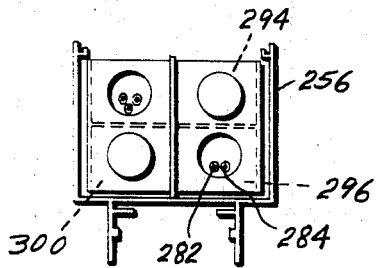
Figure 38:
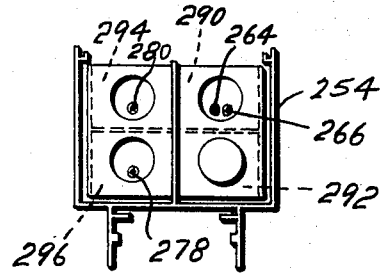
Figure 41:
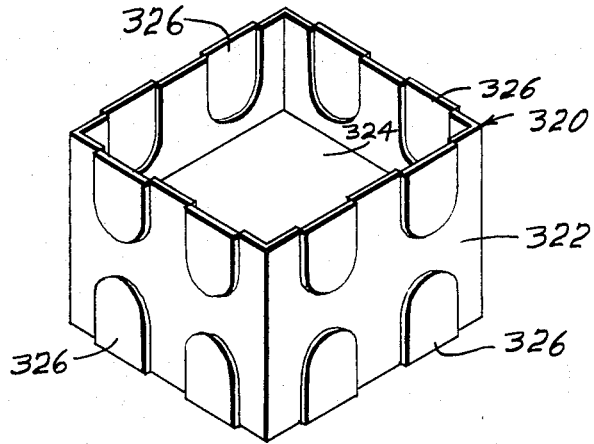
Figure 42:
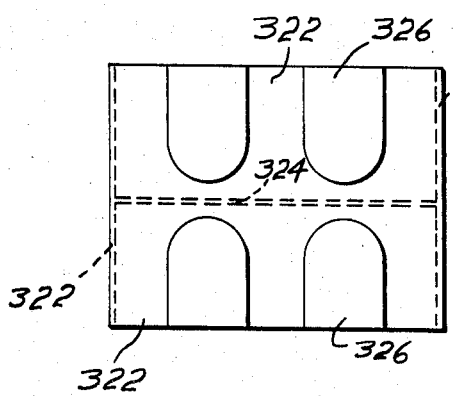
Figure 43:
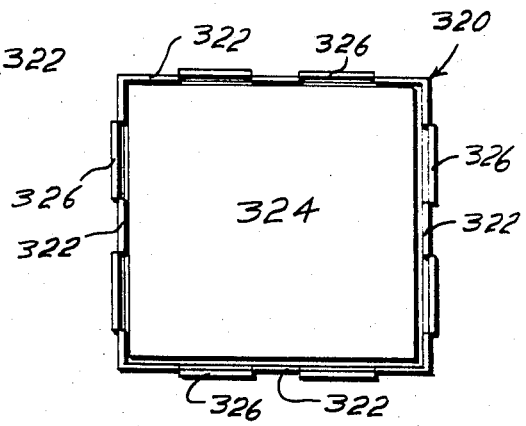

4 lines and communication lines in the four-way cross and in the circuit and system voltage separator;

FIGURE 37, taken on line 37—37 of FIGURE 36, is an end view looking in one end of the leg of the four-way cross unit and shows the power lines and the communication lines in said leg and also in the voltage and system separator;

FIGURE 38, taken on line 38—38 of FIGURE 36, is an end view looking into the end of one leg of said four-way cross unit and illustrates the power line and the communication lines in the circuit and system voltage separator;

FIGURE 39 is a side-elevational view of a cornice end cap and shows the flat base portion and the outwardly projecting leg;

FIGURE 40 is a front elevational view of a cornice end cap and shows a flat base portion, the skirt portion and the legs;

FIGURE 41 is an isometric view looking down on another circuit and system voltage separator and illustrates a central partition for dividing the separator into two halves;

FIGURE 42 is a side elevational view of the circuit and system voltage separator of FIGURE 41; and FIGURE 43 is a plan view looking down on the circuit and system voltage separator of FIGURE 41.

Figure 1:
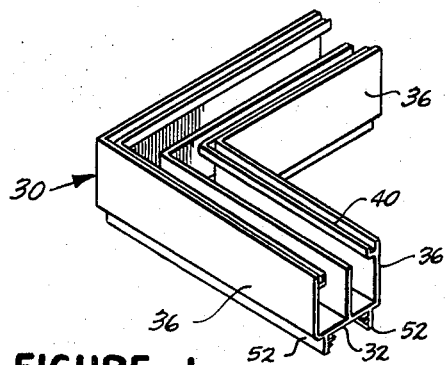
FIGURE 1 is an isometric view of an L-section and illustrates the two legs of the same.
Figure 2:
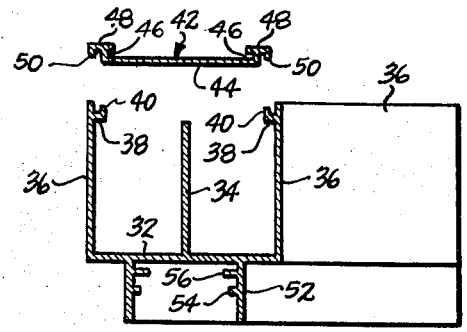
FIGURE 2 is an end view of the L-section looking into one leg of the same and illustrates a cap for fitting over the top of the L-section.

In the drawings it is seen that the electrical raceway wiring system comprises components for separating one system of wires at a first electrical potential from a second system of wires at a second electrical potential. In FIGURES 1 and 2 there is illustrated an L-angle member 30 having an integral base member 32, an upright center separator 34, and upright exterior walls 36 in a spaced apart relationship. On the upper part of the sidewalls 36, and on the inner surface, there is a snap cover locking means having an inwardly directed member 38 and an upwardly directed member 40. It is seen that the upper part of the wall 36, and the members 38 and 40 define a channel. Also, it is seen that the walls 36 are longer and higher than the central separator 34. The cap 42 fits with the walls 36. The cap 42 has a base 44 and the outer end of this forms an upright member 46. Said upright member 46 being at right angles to the base 44. Then, the member 46 is capped by a T 48 which on the outer edge turns downwardly into a lip or flange 50. In the assembled state the flange 50 fits into the channel defined by the upper part of the wall 36, and the members 38 and 40. On the lower part of the base 32 there is a depending facing comprising two spaced-apart downwardly legs 52. On the inner surface of these legs 52 is an inwardly directed upper flange 56 and an inwardly directed lower flange 54. The flange 56 is somewhat longer than the flange 54. The purpose of the legs 52 is to allow the proper alignment of the raceway on top of the partition system; the upper flange 56 is for positioning the raceway on the structural wall; and, the lower flange 54 is for aligning the raceway on the structural wall.

Figure 3:
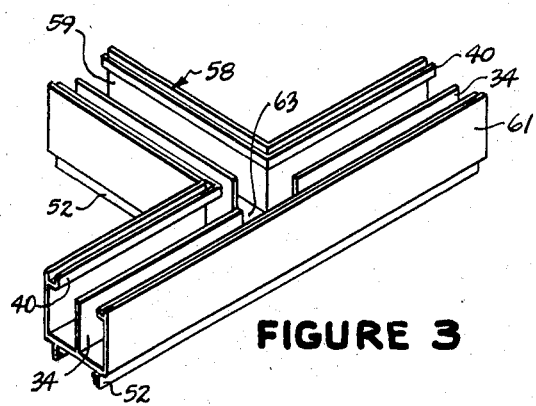
FIGURE 3 is an isometric view looking down on a T-section and shows a leg member and a cross member.
Figure 4:
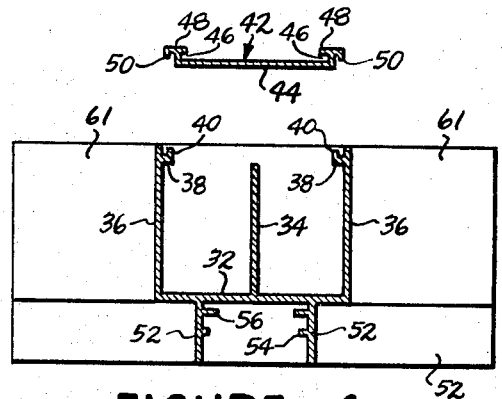
FIGURE 4 is an end view looking into the leg member of the T-section and shows a cap for fitting over the T-section.

In FIGURES 3 and 4 there is illustrated a T 58. The T 58 is compatible with the L-angle 30 and therefore the same reference numerals will be used for the integral base member, the upright interior separator, the upright exterior walls, the depending facing and the like. The T 58 has a leg member 59 and a cross member 61. The cross member 61 may be considered to comprise a discontinuous upright interior separator, a continuous outer upright exterior wall and a discontinuous inner upright exterior wall with the discontinuous inner upright exterior wall meeting with the upright exterior walls of the leg member 59 at miter joints. The discontinuous inner upright exterior wall and the discontinuous upright interior separator may be considered to define a void space 63. The miter joints may be a welded joint.

Figure 5:
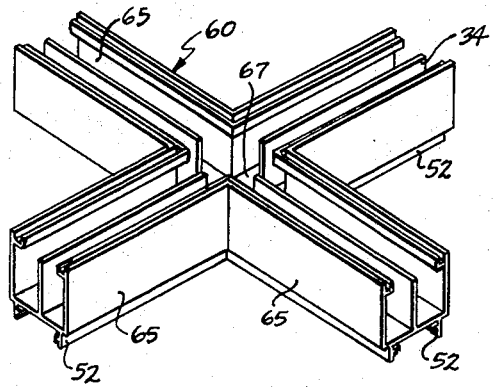
FIGURE 5 is an isometric view looking down on a four-way cross unit.
Figure 6:
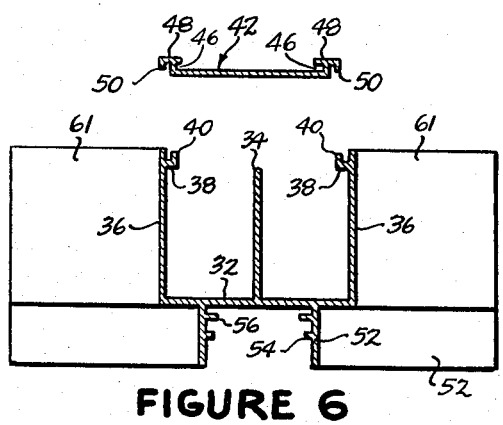
FIGURE 6 is an end view looking into one leg of the four-way cross unit and illustrates a cap for fitting over the four legs of the four-way cross unit.

In FIGURES 5 and 6 there is illustrated a four-way cross 60. Again, the members of the cross 60 are compatible with the T 58 and also with the L-angle 30.

Therefore, similar reference numbers will be used for the integral base member, the upright interior separator, the upright exterior walls, the depending facing and the like. The cross 60 has four legs 65 at right angles, with the base members 32 being integral and the upright exterior walls and the upright interior separator being discontinuous so as to leave a void space 67 at the center of the cross.

Figure 7:
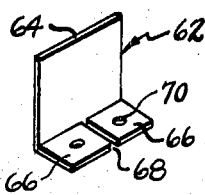
FIGURE 7 is an isometric view looking at an angle end cap and shows the main flat portion and two legs of the same.
Figure 8:
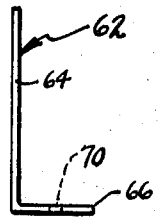
FIGURE 8 is an edge view of the angle end cap and shows the main flat portion and a leg.

In FIGURES 7 and 8 there is illustrated an angle end cap 62 having an upright main flat portion 64 and two legs 66. The legs 66 are at a right angle to the main portion 64. It is noted that the legs 64 are separated from each other and define a groove 68. The groove 68 fits with the upright interior separator 34 so that the separator 34 is in the groove 68. Also, it is noted that in each of the flat portions 66 there is a passageway or central opening 70. In the assembled state with the legs 66 projecting into the two channels of the raceway, screws or nails may be utilized in the two openings 70 and also in the partition to fasten the end cap in place.

Figures 9, 10:
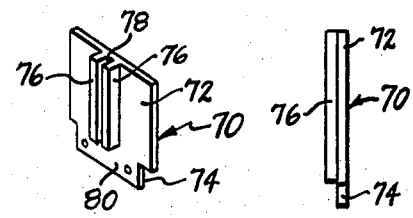
FIGURE 9 is an isometric view of a flush end cap and shows the flat base portion, a groove in the center and a skirt.
FIGURE 10 is a side view of the flush end cap.

In FIGURES 9 and 10 there is illustrated a flush end cap 70 comprising a flat base portion 72. On the lower end of the flat base portion 72 there is a cut-away or step 74. On the inner face of 72 there are two spaced-apart legs 76. These legs 76 define a channel or groove 78. In operation the groove 78 fits over the upright interior separator 34. It is noted that on the lower edge of the flat portion 76 there are two spaced-apart openings or passageways 80. In the assembled state with the groove 76 fitting over the separator 34 screws or nails may be pounded into the partition through the passageways 80 to hold the end cap in position.

In FIGURES 39 and 40 there is illustrated a cornice end cap 330. This cap comprises a main flat portion 332 and a skirt 334 on one side of the main flat portion with the main flat portion and the skirt being in the same plain. There are two spaced-apart legs 336 projecting outwardly from the main flat portion and at an angle with the main flat portion. The two spaced-apart legs define a groove 338 between themselves. The groove 338 fits with the upright interior separator 34 so that the separator 34 is in the groove. It is noted that in each of the legs 336 there is a passageway 340. In the assembled state with the legs projecting into the two channels of the raceway, screws or nails are utilized in the two openings 340 and also in the partition to fasten the end cap in place.

In FIGURES 11 and 12 there is illustrated a raceway connector 82. More particularly, in FIGURE 12 there is illustrated an end view of a raceway connector 82. In FIGURE 11 there is illustrated two raceway connectors in a side by side relationship. Raceway connector 82 comprises a base 84, a long leg 86 and a shorter leg 88. Also, in the base 82 there is an opening or passageway 90. In FIGURE 11 it is seen that the two raceway connectors 82 are in a side by side relationship with the short legs 88 adjacent to each other and the long legs 86 on the outside. The reason for this is that in connecting raceways together such as an L-angle 30, a straight section, a T 58 or a four-way cross 60 the raceway connector 82 fits between the upright interior separator 34 and the upright exterior wall 36. The functions of the raceway connector 82 are many. For example, the connector 82 aligns the separate raceway components to the raceway proper; at the junction of the raceway components it provides a smooth interior as the straight sections, the L-angle 30, the T 58 and the four-way cross 60 have burrs as these components are cut with a saw. Naturally, it is seen that by having a smooth interior there is less possibility of abrasion and the breaking of the insulating jacket around the electrical conductors. Also, it is possible to fasten screws or pound nails through the passageways 90 so as to connect the raceway connectors, and the raceway components to the top of the partition. In this manner there is provided a more rigid raceway system. Finally, an important function of the raceway connector is to provide electrical continuity so that one part of the raceway is not isolated from another part of the raceway and therefore through some fault or inadvertence is not at a different electrical potential than the main part of the raceway.

In FIGURES 15, 16, and 17 there is illustrated a center fin replacement clip 92 having a web portion 94 which separates into a clevis member on each end. More particularly, the clevis member on each end defines two spaced-apart legs 95. These legs 95 in turn define a groove 96. In usage the clip 92 is used for repairing or renovating raceway where the upright interior separator 34 has been removed. More particularly, in many instances for a lead-in of electrical connections the separator 34 has been removed. At a later date it may be desirable to tear down this particular partition section and re-use the raceway. With the center partition removed it is not possible to re-use the raceway. Therefore, there is provided the replacement clip 92 which bridges the gap in the separator 34. This is brought forth in FIGURE 23, a plan view showing the clip 92 in place between a discontinuous upright interior separator 34.

In FIGURES 18, 19 and 20 there is illustrated a reversible voltage separator 98. The reversible voltage separator 98 has a central base portion 100, two outwardly directed flanges 102. Flanges 102 are at an angle with the base 100. These flanges turn outwardly to form legs 104. The legs 104 separate into a clevis member on each end having fingers 105. The fingers 105 define a groove 106. In operation it is quite often desirable to have the electrical wiring system enter through the base 32 of the raceway. In order to do this the upright interior separator 34 is routed away or removed. Then, a passageway 108 is drilled in the base 32 and the electrical wiring system is brought up through this passageway. The reversible voltage separator 98 bridges a gap between the upright partitions 34 and also forms a side wall around the entrance into the base 32.

This is brought forth in FIGURE 21, a plan view showing the separator 98 in place between a discontinuous upright interior separator 34. In FIGURE 22 is illustrated an end view of a reversible voltage separator positioned between a discontinuous upright interior separator 34. Its function is to isolate a first set of conductors at one potential, from a second set of conductors at another potential.

In FIGURE 22 there is illustrated a lateral cross-sectional view of a reversible voltage separator in the raceway. More particularly, there is shown a structural wall panel 110 having outer walls 112. Between the outer walls 112 there is a conduit 114. The conduit 114 runs up to substantially the integral base member 32. On the upper end of the conduit there is an adapter 116. This adapter 116 projects through the passageway 108 and screwed onto the other end of 116 is a lock nut 118. It is seen that there are two power lead wires 120 connecting with a receptacle 122. These lead wires 120 pass through the conduit and are illustrated as being exposed in the raceway. In the raceway there is illustrated power lines 124 on one side of the upright interior separator 34 and also the reversible voltage separator 98 and on the other side there is illustrated communication or telephone lines 126. This figure illustrates the laying of high voltage lines and low voltage lines on opposite sides of the separator 34 and also the running of additional power lines, or high voltage lines, up into the partition and into the raceway.

In FIGURES 24 and 25 there is illustrated an internal-L 128 which is composed of two straight extrusions which have been joined at a miter joint. These straight extrusions may be joined at 130 by welding. Again, since the internal-L 128 may be fabricated from two straight sections the same reference numerals are employed for similar elements of the raceway such as an integral base member 32, upright exterior walls 36, and an upright center separator 34.

In FIGURES 26 and 27 there is illustrated an external-L 132. The external-L 132 is fabricated from two straight sections which are joined at a miter joint 134. These two straight sections may be joined by means of welding. Again, since two straight sections are employed, like reference numerals will be used for similar elements of the raceway such as an integral base member 32, upright exterior walls 36, and an upright center separator 34.

In FIGURES 13 and 14 there is illustrated a circuit and system voltage separator 140. 140 may be considered to be a box having a divider which divides it into two halves. Then, each half is divided into four parts or volumes. The net result is that there are eight equally sized parts or volumes. Divider 140 comprises four exterior walls 142, a horizontal divider 144, and four bisecting barrier strips 146 and 150. The walls 142 have central slots 148. The bisecting barrier strip 146 has outwardly projecting lugs or legs 152 on opposite ends and in the central portion a slot 154. The legs are on one edge and the slot 154 is in the other edge. In the bisecting barrier strip 150 there are legs 156 on opposite ends and in the same edge there is a slot 158. In assembling the separator 140 the legs 156 of the strip are inserted into the slots 148 in the opposite walls 142 in one half of the separator. Then, in the other half of the separator the legs 152 of strip 146 are inserted into the slots 148 of the two opposed sides 142 and the slot 154 is inserted in the slot 158. Then, the divider 144 may be placed in the separator 140 and between the walls 142. The strip 150 may be inserted with the legs 156 into the slots 148 of two opposed walls. Then, the legs 152 of the strip 146 may be inserted in the slots 158 of two opposed walls 142. In this manner the walls 142 are positioned, the divider 144 is positioned, and the bisecting barrier strips 146 and 150 are positioned. The walls 142 may be welded at their edges to form the box of the separator. It is seen that in the walls 142, that there are circular breakaway knockouts 160. Also, in the divider 144 there is a knockout 162. And, in the bisecting barrier strips 146 and 150 there are knockouts 164.

In FIGURES 30 through 35 there is illustrated another circuit and system voltage separator 180 and the component parts. More particularly, this voltage separator is composed of two extrusions 182. The extrusion 182 has two exterior walls 184 and 186. The walls 184 and 186 are at right angles to each other and on the end of the wall 184 there is an inwardly directed ridge 188 and spaced inwardly from the ridge 188 is a second inwardly directed ridge 190. The ridges 188 and 190 form a cavity or what is referred to as a female slide member 192. On the end of the side 186 there is an outwardly directed ridge 194. The ridge 194 is referred to as a male slide member. The two extrusions 182 may be joined together by having the male member 194 on one extrusion, slide into the female member 192 on the other extrusion, as is illustrated in FIGURES 30 and 31. In the side 184 there are slots 196 in the free edges substantially equidistant between the ends of the side 184. Likewise, in the side 186 there are slots 198 in the free edges substantially equidistant between the ends of the side 186. In the side 186 there are four horseshoe-type knockouts 200, one in each quarter of the side. Likewise, in the side 184 there are four horseshoe-type knockouts 202, one in each quarter of the side.

In FIGURES 33 and 34 there are illustrated barrier strips 204 and 214. Strip 204 is a flat piece having a main body portion 206 with two spaced-apart circular knockouts 208. There are two outwardly projecting lugs 210. In the central portion of the body 206 there is a slot or groove 212. The slot 212 is in the same edge as are the lugs 210. The strip 214 has a body portion 216. There are two spaced-apart circular knockouts 218 and on the edges there are two outwardly directed lugs 220. In the shorter edge there is a slot or groove 222. The slot 222 is in one edge and the lugs 220 form part of the other edge. It is seen that the separators 204 and 214 differ in the positioning of the slots 212 and 222, with respect to the lugs 210 and 220. The separators 204 and 214 mate together as illustrated in FIGURES 30 and 35. In FIGURE 30 it is seen that the lugs 210 fit in the slots or grooves 198 in the walls 186. Also, the lugs 220 fit in the slots or grooves 196 in the walls 184. In this arrangement the slot 222 fits over the body portion 206 of the separator 204 and the slot 212 fits over the body portion 216 of the separator 214.

In the circuit system voltage separator 180 there is a divider 230. The divider 230 fits between one set of separators 204 and 214 and another set of separators 204 and 214. More particularly, considering in a vertical configuration there is an upper set of separators 204 and 214, a divider 230 and a lower set of separators 204 and 214. The divider 230, comprises a body portion 232, which is generally in the configuration of a square, but on opposed diagonal corners there is a bias cut or bias edge 234, which is substantially at a 45° angle with the side edges of the body portion 232. Also, there are four circular knockouts 236, one in each quadrant of the divider 230.

In FIGURE 36 there is illustrated the positioning of a circuit and system voltage separator in a four-way cross member 60. The voltage separator is identified by reference numeral 250. This voltage separator may be similar to 140 or 180. The separator 250 is positioned in the void 67 of the four-way cross. The four-way cross has four legs, 252, 254, 256 and 258. Each of these legs has two spaced-apart upright exterior wall members and an upright interior separator. In the leg 252 there are two communication lines 260 and 262; in the leg 254, two communication lines 264 and 266; in the leg 256, three communication lines 268 and 270 and 272; and, in the leg 258, there are the communication lines 260 and 262, 264, 266, 268, 270 and 272. In the leg 252, there are two power lines 274 and 276; in the leg 254 there are two power lines 278 and 280; in the leg 256 there are two power lines 282 and 284; and, in the leg 258 there are six power lines, 274, 276, 278, 280, 282 and 284.

It is seen that in all of the legs of the four-way cross unit, and the circuit and system voltage separator 250, that the power lines and the communication lines are isolated from each other. More particularly, the separator 250 has eight individual cells, four upper cells and four lower cells. It is seen that there is an upper cell 286 and a lower cell 288; an upper cell 290 and a lower 292; an upper cell 294 and a lower cell 296; and, an upper cell 298 and a lower cell 300. It is seen that there are circular knockouts in the walls of the separator and also in the divider 302 of the separator. It is to be recalled that the divider 302 divides the separator into two equal halves. Then, there are two bisecting barrier strips 304 and 306 which are at right angles to each other and divide each half into four equal cells, so that the separator has the eight previously mentioned cells. In the interior walls of the separator there is a circular knockout leading to each cell and in the divider 302 there are four knockouts so that one cell in one-half of the separator can communicate with the adjacent cell in the other half of the separator; and in the barrier strips there are knockouts so that the adjacent cells may have a common opening with each other.

In the leg 252 it is seen that there are the two communication lines 260 and 262. It is desired that these communication lines go over to the leg 258. The communication lines 260 and 262 pass through the knockout in the wall of the separator and into the cell 286, through the knockout connecting the cell 286 with the cell 298, and then bend and run through the knockout in the wall adjacent the leg 258 and into the communication side of the leg 258. It is to be remembered that the cell 286 is close to the viewer in FIGURE 36. In the leg 254 there are two communication lines 264 and 266 and it is desired that these two communication lines go into the communication side of the leg 258. The lines 264 and 266 pass through the knockout in the wall of the separator 250 and pass into the cell 290, through the knockout between the cells 290 and 286, bend so as to run through the knockout between the cell 286 and the cell 298, and bend and run through the knockout in the wall of the separator 250 adjacent the leg 258. It is to be remembered that the cells 290, 286 and 298 are near the viewer of FIGURE 36. In the leg 256 there are three lines 268, 270 and 272. It is desired that these three communication lines pass from the leg 256 to the leg 258. The lines 268, 270 and 272 run through the knockout in the wall of the separator 250 and into the cell 298 and then run through the knockout in the separator 250 adjacent the leg 258. It is to be remembered that the cell 298 is seen by the viewer of FIGURE 36.

With respect to the power lines in the legs it is seen that in the leg 252 there are power lines 274 and 276. These power lines pass through the knockout in the wall of the separator 250 and into the cell 292, bend and run through the knockout in the barrier strip 306 between the cells 288 and 292, and run through the knockout in the wall of the separator 250 adjacent the leg 258. The cells 292 and 288 are hidden from view in the separator and the lines 274 and 276 in the separator are illustrated in phantom to show that these lines are hidden from the observer. In the leg 254 there are two power lines 278 and 280. It is desired that these power lines go from leg 254 to the leg 258. The lines 278 and 280 pass through a knockout in the wall of the separator and into the cell 294. The line 280 passes through an upper knockout in the wall 250 and into the cell 294 and then passes through a knockout in the divider 302 and into the cell 296. The power line 278 passes through a lower knockout in the wall of the separator 250 and into the cell 296. It is to be remembered that the main portion of the cell 296 is hidden from view. Then, the power lines 278 and 280 pass through a knockout in the hidden barrier strip 304 and into the cell 292, bend and run through a knockout in the hidden barrier strip 306 and run into the cell 288, and then run through a knockout in the exterior wall and into the leg 258. In the leg 256 there are two power lines 282 and 284. It is desired that these power lines run from the leg 256 to the leg 258. The power lines 282 and 284 pass through a knockout in the wall of the separator 250 and into the cell 296, run through a knockout in the hidden barrier strip 304 and into the cell 292, run through a knockout in the hidden barrier strip 306 and into the cell 288, and through a knockout in the wall of the separator 250 and into the leg 258. From this description it is seen that the power lines and communication lines are isolated from each other, may pass from one leg to another leg, and yet can be fully isolated from each other even though they do cross over each other as there is either a barrier strip or a divider between the power lines and the communication lines. There has been provided a means for isolating the power lines from the communication lines even though they are in close proximity to each other and pass over or under each other.

In FIGURE 29 there is illustrated a circuit and system voltage separator 310. This separator is substantially the same separator as 180 except that instead of having horseshoe-type knockouts in the barrier strips and in the exterior walls it has circular knockouts 312. Therefore, the same reference numerals as used for the walls, divider, and barrier strips for separator 180 will also be used for separator 310. Likewise 310 may be used along with separators 140 and 180 in FIGURE 36 for illustrating the wiring in a four-way cross unit.

Although the illustration of the use of the circuit and system voltage separator has been illustrated in conjunction with the four-way cross it is to be understood that such a separator may also be used with a T-member as well, as there is a void space in the T-member.

In FIGURES 41, 42 and 43 there is illustrated a modified circuit and system voltage separator 320 having four side walls 322, a divider 324 to divide the separator into a first half and a second half. It is noted that in the side walls that there are horseshoe-type knockouts 326. There are two knockouts 326 on each edge of each wall making a total of four knockouts in each wall or in one-half of the separator there are eight knockouts. This type of separator is employed in a less complex system than are the separators 140, 180 and 250. With this type of separator it is possible to still isolate the power lines from the communication lines so that the power lines will go in one cell of a straight section or in a straight section of the raceway or a leg of the raceway and the communication lines will go in another cell of a straight section of the raceway. The divider 324 isolates the communication lines from the power lines in the separator 320. It is to be realized that this separator cannot be used for as complicated a wiring as the separators 140, 180 and 250. It is seen that the divider 324 does not have breakaway knockouts.

In FIGURE 28 there is a schematic illustration of a room constructed of partitions 110 and the electrical raceway system. The partitions themselves are supported, schematically illustrated, on legs 170. At the lower right hand corner it is seen that on top of the partition there is a straight section 172, identified by particular reference numerals. The straight section 172 has an integral base member 32, two upright exterior walls 36 in a spaced-apart relationship, an upright interior separator 34, depending facing 52, inwardly directed upper flange 56 for positioning the raceway on the partition, and an inwardly directed lower flange 54 for aligning the raceway on the partition. The raceway 172 connects with an internal-L 128 and then an external-L 132. The external-L 132 and the internal-L 128 combine to make a riser in the raceway. Then, the external-L 132 connects with the straight section 172 which in turn connects with the T 58. The T 58 branches into a right straight section 172. In the straight section 172 there is a center fin replacement clip 92 illustrated to show its function in bridging a discontinuity in the upright interior separator where an extension from the raceway has been abandoned. The section 172 connects with the L 30. Then, the L 30 connects with another straight section 172. In the straight section 172 there is a reversible voltage separator clip 98 illustrated to show its function in allowing an extension to be made from the raceway to an outlet at the base of the partition for either communication or power use and yet isolates the communication and the power lines. This section 172 connects with another L 30. Then, the L 30 projects around the corner and connects with another straight section 172. This straight section 172 connects with a four-way cross 60. The cross 60 splits into four legs, one leg of which folds back and is directed towards the T 58. This leg connects with a straight section 172 and which section in turn connects with the T 58. In this manner there is illustrated the use of all of the components of the electrical raceway system showing one possible configuration in association with modular partitions. It is readily seen that the replacement of an L 30 with a T 58 that an extension in a lateral direction can be made, and, extensions from the four-way cross 60 can be made to serve another office or area. At the place the electrical raceway system is terminated end caps are used. It is seen that the high voltage lines and the low voltage lines are kept in their separate compartments or cells in the raceway and are not on the floor and are not at such a height that a person may run into them while walking from one place in the room to another place. In other words, the high voltage lines and the low voltage lines are kept out of sight and from under the feet of people working in this area.

From the foregoing it is seen that I have provided a system whereby power lines and communication lines can be in the same envelope and yet can be isolated from each other, both electrically and physically; also I have provided a low-cost electrical raceway system which has an attractive cornice for fitting with the partition walls and the like, and because of said cornice there is eliminated the use of electrical conduit and also there is eliminated the use of a separate cornice and a separate raceway wiring system; I have provided a system which eliminates loose wires on the floor, both power wires and communication wires, thereby making the use of the floor area safer, have eliminated overhead hanging wires so that a person walking may not bump or come entangled in overhead power wires or overhead communication wires; and have provided an electrical raceway system which is easy to install on partition walls and the like and also it is possible to add new power lines or communication lines to the raceway and also to subtract power lines or communication lines from the raceway.

Having presented my invention what I claim is:

1. An electrical raceway system for providing an electrical power line and an electrical communication line to an area, and at different elevations in the area, said system comprising:
   (a) a first straight section having upright exterior walls and an upright interior separator forming a first cell and a second cell for housing an electrical power line in the first clel and an electrical communication line in the second cell;
   (b) said first straight section connecting with a four-way cross unit having four legs and each leg having upright exterior walls and an upright interior separator forming a first cell and a second cell for housing an electrical power line in the first cell and an electrical communication line in the second cell;
   (c) the upright interior separator of each leg of the four-way cross unit terminating at the interior end of the leg to define a void space in the interior of the cross unit;
   (d) a circuit and system voltage separator unit inserted into said void space and fitting with said four-way cross unit;
   (e) said circuit and system voltage separator unit having four exterior walls and a divider which divides the space defined by said walls into an upper half and a lower half, and each half being divided into quarter units by two barrier strips which are substantially at right angles to each other and run from one exterior wall to the opposite exterior wall, breakaway knockouts in each exterior wall and adjacent each quarter unit to define a passageway into the quarter unit, breakaway knockouts in said barrier strips to define a passageway between adjacent quarter units, and breakaway knockouts in the divider to define a passageway between upper and lower adjacent quarter units;
   (f) said four-way-cross unit, for identification purposes, having a first leg, a second leg, a third leg and a fourth leg, said first and third legs being substantially at right angles to the second and fourth legs, and said first leg connecting with the first straight section;
   (g) said second leg of the four-way-cross unit connecting with a second straight section;
   (h) said second straight section having upright exterior walls and an upright interior separator forming a first cell and a second cell for housing an electrical power line in the first cell and an electrical communication line in the second cell;
   (i) said second straight section connecting with a first L-section;
   (j) said first L-section having upright exterior walls and an upright interior separator forming a first cell and a second cell for housing an electrical power line in the first cell and an electrical communication line in the second cell;
   (k) said first L-section having a first leg and a second leg with said first leg connecting with the second straight section and the second leg connecting with a third straight section;
   (l) said third straight section having upright exterior walls and an upright interior separator forming a first cell and a second cell for housing an electrical power line in the first cell and an electrical communication line in the second cell;
   (m) the upright interior separator in the third straight section being discontinuous and receiving a reversible voltage separator clip;
   (n) said reversible voltage separator clip having two legs bridging the gap in the interior separator and an integral base member, with said base member being offset so as to be closer to one exterior wall than the other exterior wall;
   (o) said third straight section connecting with a second L-section;
   (p) said second L-section having upright exterior walls and an upright interior separator forming a first cell for housing an electrical power line in the first cell and an electrical communication line in the second cell;
   (q) said second L-section having a first leg and a second leg with said first leg connecting with the third straight section and the second leg connecting with a fourth straight section;
   (r) said fourth straight section having upright exterior walls and an upright interior separator forming a first cell and a second cell for housing an electrical power line in the first cell and an electrical communication line in the second cell;
   (s) the upright interior separator in the fourth straight section being discontinuous and receiving a center fin replacement clip;
   (t) said center fin replacement clip having a base member and means on the end of the base member connecting with the upright interior separator;
   (u) said fourth straight section connecting with a T-section having a leg member and a cross member;
   (v) said leg member having one leg and said cross member having two discontinuous legs, and each of said legs having upright exterior walls and an upright interior separator forming a first cell for housing an electrical power line in the first cell and an electrical communication line in the second cell;
   (w) the upright interior separator of each leg of the T-section terminating at the interior of the leg to define a void space;
   (x) a circuit and system voltage separator unit inserted into said void space and fitting with said T-section;
   (y) said fourth straight section connecting with the leg member of the T-section;
   (z) one leg of said T-section connecting with a fifth straight section;
   (aa) said fifth straight section having upright exterior walls and an upright interior separator forming a first cell and a second cell for housing an electrical power line in the first cell and an electrical communication line in the second cell;
   (bb) and said fifth straight section connecting with the third leg of the four-way-cross unit;
   (cc) the other leg of said T-section connecting with an external L-section for going from a first elevation to a second elevation;
   (dd) said external L-section having a first leg and a second leg mating with each other at an angle, with the first and second legs having outside upright exterior walls and an outside upright interior separator forming a first cell and a second cell for housing an electrical power line in the first cell and an electrical communication line in the second cell;

(ee) the first leg of the external L-section connecting with the T-section and the second leg connecting with and internal L-section;

(ff) said internal L-section having a first leg and a second leg mating with each other at an angle, with the first and second legs having inside upright exterior walls and an inside upright interior separator forming a first cell and a second cell for housing an electrical power line in the first cell and an electrical communication line in the sceond cell;

(gg) the first leg of the internal L-section connecting with the second leg of the external L-section;

(hh) the second leg of the internal L-section connecting with a sixth straight section having upright exterior walls and an upright interior separator forming a first cell and a second cell for housing an electrical power line in the first cell and an electrical communication line in the second cell;

(ii) an angle end cap on the free end of the sixth straight section;

(jj) said angle end cap having an upright member and a base member with the base member having a slot fitting over the upright interior separator and with the upright member flush covering the ends of the first and second cells;

(kk) a flush end cap on the free end of the fourth leg of the four-way-cross unit;

(ll) said flush end cap having a base member and a keyway on the internal face of the base member fitting with the upright interior separator to flush cover the ends of the first and second cells;

(mm) a raceway connector inserted at the junctions of the separate components, namely, the four-way-cross unit, the L-section, the T-section, the external L-section, the internal L-section, and combinations with the straight sections; and (nn) said raceway connector comprising a base member and two upright legs fitting with an between an upright exterior wall and an upright interior separator.

2. An electrical raceway system having an electrical power line and an electrical communication line, said system comprising:

(a) a first straight section with an integral base member, upright exterior walls, and an upright interior separator, said upright exterior walls being spaced apart and said upright interior separator being between said upright exterior walls, to form a first cell housing an electrical power line and a second cell housing an electrical communication line;

(b) said first straight section connecting with a four-way cross unit having four legs and each leg having an integral base member, upright exterior walls and an upright interior separator, said upright exterior walls being spaced apart and said upright interior separator being positioned between the exterior walls, to form a first cell housing an electrical power line and a second cell housing an electrical communication line, and said base members being integral with each other;

(c) the upright interior separator of each leg of the four-way cross unit terminating at the interior end of the leg to define a void space in the interior of the cross;

(d) a circuit and system voltage separator unit inserted into said void space and fitting with said four-way cross unit;

(e) said circuit and system voltage separator unit having four exterior walls and a divider which divides the space defined by said walls into an upper half and a lower half, and each half being divided into quarter units by two barrier strips which are substantially at right angles to each other and run from one exterior wall to the opposite exterior wall, breakaway knockouts in each exterior wall and adjacent each quarter unit to define a passageway into the quarter unit, breakaway knockouts in said barrier strips to define a passageway between adjacent quarter units, and breakaway knockouts in the divider to define a passageway between upper and lower adjacent quarter units;

(f) said four-way cross unit, for identification purposes, having a first leg, a second leg, and a third and fourth leg, said first and third legs being substantially at right angles to the second and fourth legs, and said first leg connecting with the first straight section;

(g) said second leg of the four-way cross unit connecting with a second straight section;

(h) said second straight section having an integral base, upright exterior walls and an upright interior separator, said upright exterior walls being spaced apart from each other and said upright interior separator being positioned between the upright exterior walls to form a first cell housing an electrical power line and a second cell housing an electrical communication line;

(i) said second straight section connecting with a first L-section;

(j) said first L-section having an integral base, upright exterior walls and an upright interior separator, said upright exterior walls being spaced apart from each other and said upright interior separator being positioned between the upright exterior walls to form a first cell housing an electrical power line and a second cell housing an electrical communication line;

(k) said first L-section having a first leg and a second leg with said first leg connecting with the second straight section and the second leg connecting with a third straight section;

(l) said third section having an integral base, upright exterior walls and an upright interior separator, said upright exterior walls being spaced apart from each other and said upright interior separator being positioned between said upright exterior walls to form a first cell housing an electrical power line and a second cell housing an electrical communication line;

(m) the upright interior separator in the third straight section being discontinuous and receiving a reversible voltage separator clip;

(n) said reversible voltage separator clip having two legs bridging the gap in the interior separator and with an integral base member, with said base member being offset so as to be closer to one exterior wall than the other exterior wall;

(o) said third straight section connecting with a second L-section;

(p) said second L-section having an integral base, upright exterior walls and an upright interior separator, said upright exterior walls being spaced apart from each other and said upright interior separator being positioned between said upright exterior walls to form a first cell housing an electrical power line and a second cell housing an electrical communication line;

(q) said second L-section having a first leg and a second leg with said first leg connecting with the third straight section and the second leg connecting with a fourth straight section;

(r) said fourth straight section having an integral base, upright exterior walls, and an upright interior separator, said upright exterior walls being spaced apart from each other and said upright interior separator being positioned between said upright exterior walls to form a first cell housing an electrical power line and a second cell housing an electrical communication line;

(s) the upright interior separator in the fourth straight section being discontinuous and receiving a center fin replacement clip;
(t) said center fin replacement clip having a base member and means on the end of the base member and connecting with the upright interior separator;
(u) said fourth straight section connecting with a T-section having a leg member and a cross member;
(v) said leg member having one leg and said cross member having two discontinuous legs and each of said legs having an integral base and upright exterior walls and an upright interior separator, said upright exterior walls being spaced apart from each other and said upright interior separator being positioned between said upright exterior walls to form a first cell housing an electrical power line and second cell housing an electrical communication line;
(w) the upright interior separator of each leg of the T-section terminating at the interior end of the leg to define a void space;
(x) a circuit and system voltage separator unit inserted into said void space and cofitting with said T-section;
(y) said fourth straight section connecting with the leg member of the T-section;
(z) one leg of said T-section connecting with a fifth straight section;
(aa) said fifth section having an integral base and upright exterior walls and an upright interior separator, said upright exterior walls being spaced apart from each other and said upright interior separator being positioned between said upright exterior walls, to form a first cell housing an electrical power line and a second cell housing electrical communication lines;
(bb) and said fifth straight section connecting with the third leg of the four-way cross unit;
(cc) the other leg of said T-section connecting with an external L-section for going from a first elevation to a second elevation;
(dd) said external L-section having a first leg and a second leg mating with each other at an angle, with the first and second legs having an integral base and outside upright exterior walls and an outside interior upright separator, said outside upright exterior walls being spaced apart from each other and said outside upright interior separator being positioned between said outside upright exterior walls, to form a first cell housing an electrical power line and a second cell housing an electrical communication line;
(ee) the first leg of the external L-section connecting with the T-section and the second leg connecting with an internal L-section;
(ff) said internal L-section having a first leg and a second leg mating with each other at an angle, with the first and second legs having an integral base and inside upright exterior walls and an inside upright interior separator, said inside upright exterior walls being spaced apart from each other and said inside upright interior separator being positioned between said inside upright exterior walls to form a first cell housing an electrical power line and a second cell housing an electrical communication line;
(gg) the first leg of the internal L-section connecting with the second leg of the external L-section;
(hh) the second leg of the internal L-section connecting with a sixth straight section having an integral base and upright exterior walls and an upright interior separator, said upright exterior walls being spaced apart, said upright interior separator being positioned between said upright exterior walls, to form a first cell housing an electrical power line and the second cell housing an electrical communication line;
(ii) an angle end cap on the free end of the sixth straight section;
(jj) said angle end cap having an upright member and a base member with the base member having a slot fitting over the upright interior separator and with the upright member flush covering the ends of the first and second cells;
(kk) a flush end cap on the free end of the fourth leg of the four-way cross unit;
(ll) said flush end cap having a base member and a keyway on the internal face of the base member fitting with the upright interior separator to flush cover the ends of the first and second cells;
(mm) a raceway connector inserted at the junctions of the separate components, namely, the four-way cross unit, the L-section, the T-section, the external L-section, the internal L-section, and combinations with the straight sections; and
(nn) said raceway connector comprising a base member and two upright legs fitting with and between an upright exterior wall and an upright interior separator.

3. A combination of an electrical raceway system and a structural wall, such as a partition, for providing an electrical power line and an electrical communication line to an area, and at different elevations in the area, said system comprising:
(a) a first straight section having an integral base member, upright exterior walls, an upright interior separator and depending facing, said upright exterior walls being in a spaced apart relationship and said upright interior separator being between said upright exterior walls, to form a first cell and a second cell for housing an electrical power line in the first cell and an electrical communication line in the second cell, said depending facing fitting with the structural wall;
(b) said first straight section connecting with a four-way cross unit having four legs and each leg an integral base member, upright exterior walls, an upright interior separator and depending facing to form a first cell and a second cell for housing an electrical power line in the first cell and an electrical communication line in the second cell, and said depending facing fitting with the structural walls;
(c) the upright interior separator of each leg of the four-way cross unit terminating at the interior end of the leg to define a void space in the interior of the cross unit;
(d) a circuit and system voltage separator unit inserted into said void space and fitting with said four-way cross unit;
(e) said circuit and system voltage separator unit having four exterior walls and a divider which divides the space defined by said walls into an upper half and a lower half, and each half being divided into quarter units by two barrier strips which are substantially at right angles to each other and run from one exterior wall to the opposite exterior wall, breakaway knockouts in each exterior wall and adjacent each quarter unit to define a passageway into the quarter unit, breakaway knockouts in said barriers strips to define a passageway between adjacent quarter units, and breakaway knockouts in the divider to define a passageway between upper and lower adjacent quarter units;
(f) said four-way cross unit, for identification purposes, having a first leg, a second leg, a third leg and a fourth leg, said first and third legs being substantially at right angles to the second and fourth legs, and said first leg connecting with the first straight section;
(g) said second leg of the four-way cross unit connecting with a second straight section;
(h) said second straight section having an integral base member, upright exterior walls, an upright interior separator and depending facing, said upright exterior walls being in a spaced apart relationship and said upright interior separator being between said upright exterior walls, to form a first cell and a second cell for housing an electrical power line in the first cell and an electrical communication line in the second cell, said depending facing fitting with the structural wall;

(i) said second straight section connecting with a first L-section;

(j) said first L-section having an integral base member, upright exterior walls, an upright interior separator and depending facing, said upright exterior walls being in a spaced-apart relationship and said upright interior separator being positioned between said upright exterior walls, to form a first cell and a second cell for housing an electrical power line in the first cell and for housing an electrical communication line in the second cell, and said depending facing fitting with the structural wall;

(k) said first L-section having a first leg and a second leg with said first leg connecting with the second straight section and the second leg connecting with a third straight section;

(l) said third straight section having an integral base member, upright exterior walls, an upright interior separator and depending facing, said upright exterior walls being in a spaced apart relationship and said upright interior separator being between said upright exterior walls, to form a first cell and a second cell for housing an electrical power line in the first cell and an electrical communication line in the second cell, said depending facing fitting with the structural wall;

(m) the upright interior separator in the third straight section being discontinuous and receiving a reversible voltage separator clip and a passageway in the base member in the discontinuous area between the upright interior separators and a conduit in the structural wall and said conduit connecting with said third section through said passageway to allow an electrical conductor to interconnect the third section and the conduit;

(n) said reversible voltage separator clip having two legs bridging the gap in the interior separator and an integral base member, with said base member being offset so as to be closer to one exterior wall than the other exterior wall;

(o) said third straight section connecting with a second L-section;

(p) said second L-section having an integral base member, upright exterior walls, an upright interior separator and depending facing, said upright exterior walls being in a spaced apart relationship and said upright interior separator being positioned between said upright exterior walls, to form a first cell and a second cell for housing an electrical power line in the first cell and for housing an electrical communication line in the second cell, and said depending facing fitting with the structural wall;

(q) said second L-section having a first leg and a second leg with said first leg connecting with the third straight section and the second leg connecting with a fourth straight section;

(r) said fourth straight section having an integral base member, upright exterior walls, an upright interior separator and depending facing, said upright exterior walls being in a spaced apart relationship and said upright interior separator being between said upright exterior walls, to form a first cell and a second cell for housing an electrical power line in the first cell and for housing an electrical communication line in the second cell, said depending facing fitting with the structural wall;

(s) the upright interior separator in the fourth straight section being discontinuous and having a center fin replacement clip filling a void between the upright interior separator to allow rearrangement of the raceway for further use;

(t) said center fin replacement clip having a base member and means on the end of the base member connecting with the upright interior separator;

(u) said fourth straight section connecting with a T-section having a leg member and a cross member;

(v) said leg member having one leg and said cross member having two discontinuous legs, and each of said legs having an integral base member, upright exterior walls, an upright interior separator and depending facing to form a first cell and a second cell for housing an electrical power line in the first cell and an electrical communication line in the second cell, and said depending facing fitting with the structural wall;

(w) the upright interior separator of each leg of the T-section terminating at the interior end of the leg to define a void space;

(x) a circuit and system voltage separator unit inserted into said void space and fitting with said T-section;

(y) said fourth straight section connecting with the leg member of the T-section;

(z) a first leg of said T-section connecting with a fifth straight section;

(aa) said first straight section having an integral base member, upright exterior walls, an upright interior separator and depending facing, said upright exterior walls being in a spaced apart relationship and said upright interior separator being between said upright exterior walls, to form a first cell and a second cell for housing an electrical power line in the first cell and an electrical communication line in the second cell, said depending facing fitting with the structural wall;

(bb) and said fifth straight section connecting with the third leg of the four-way cross unit;

(cc) a second leg of said T-section connecting with an external L-section for going from a first elevation to a second elevation;

(dd) said external L-section having a first leg and a second leg mating with each other at an angle, with the first and second legs having an integral base member, outside upright exterior walls, an outside upright interior separator and an inside depending facing, said upright exterior walls being in a spaced apart relationship and said interior separator being between the exterior walls, to form a first cell and a second cell for housing an electrical power line in the first cell and an electrical communication line in the second cell, and said inside depending facing fitting with the structural wall;

(ee) the first leg of the external L-section connecting with the T-section and the second leg connecting with an internal L-section;

(ff) said internal L-section having a first leg and a second leg mating with each other at an angle, with the first and second legs having an integral base member, inside upright exterior walls, and inside upright interior separator, and outside depending facing, said upright exterior walls being in a spaced apart relationship and said upright interior separator being positioned between the upright exterior walls, to form a first cell and a second cell for housing an electrical power line in the first cell and for housing an electrical communication line in the second cell, and said depending facing fitting with the structural wall;

(gg) the first leg of the internal L-section connecting with the second leg of the external L-section;

(hh) the second leg of the internal L-section connecting with a sixth straight section having an integral base member, upright exterior walls, an upright interior separator and depending facing, said upright exterior walls being in a spaced apart relationship and said upright interior separator being between said upright exterior walls, to form a first cell and a second cell for housing an electrical power line in the first cell and an electrical communication line in the second cell, said depending facing fitting with the structural wall;

(ii) an angle end cap on the free end of the sixth straight section;

(jj) said angle end cap having an upright member and a base member with the base member having a slot fitting over the upright interior separator and with the upright member flush covering the ends of the first and second cells;

(kk) a flush end cap on the free end of the fourth leg of the four-way cross unit;

(ll) said flush end cap having a base member and a keyway on the internal face of the base member fitting with the upright interior separator to flush cover the ends of the first and second cells;

(mm) a raceway connector inserted at the junctions of the separate components, namely the four-way cross unit, the L-section, the T-section, the external L-section, the internal L-section, and combinations with the straight sections; and (nn) said raceway connector comprising a base member and two upright legs fitting with and between an upright exterior wall and an upright interior separator.

4. A combination of a straight section for an electrical raceway wiring system and a structural wall, said straight section comprising on integral base member, upright exterior walls, and upright interior separator and depending facing comprising two spaced-apart downwardly directed legs, said upright exterior walls being in a spaced-apart relationship and said upright interior separator being between said upright exterior walls, a channel on the upper inner edge of each upright exterior wall, a cap on said straight section, said cap having a base member and on the outer part of said base member depending legs fitting with the channels on the upper inner face of the upright exterior walls, said depending facing having on each leg an inwardly directed upper flange and an inwardly directed lower flange, and said upper flange positioning the raceway on the structural wall and said lower flange aligning the raceway on the structural wall.

5. A combination of an L-section for an electrical raceway wiring system and a structural wall, said L-section having a first leg and a second leg, said first and second legs being integral with each other and forming an angle with respect to each other, said legs having an integral base member, upright exterior walls, upright interior separator, and depending facing comprising two spaced-apart downwardly directed legs, said upright exterior walls being in a spaced-apart relationship with respect to each other and said upright interior separator being positioned between said upright exterior walls, a channel on the inner upper face of each upright exterior wall, a cap on said raceway wiring system, said cap having a base member and two spaced apart depending legs fitting with said channel, said depending facing having on each leg an inwardly directed upper flange and an inwardly directed lower flange, said inwardly directed upper flange positioning the raceway on the structural wall and said inwardly directed lower flange aligning the raceway on the structural wall.

6. A combination of a T-section for an electrical raceway wiring system and a structural wall, said T-section having a leg member and a cross member, said leg member and said cross member having an integral base member, upright exterior walls, and an upright interior separator, and a depending facing having spaced-apart downwardly directed legs, said upright exterior walls being in a spaced-apart relationship with respect to each other and said upright interior separator being positioned between said upright interior walls to form a first cell for housing an electrical power line and a second cell for housing an electrical communication line, a channel on the upper inner face of each upright exterior wall, a cap on said T-section, said cap having a base member and depending legs fitting with said channel on the upright exterior wall, said depending facing having on each leg an inwardly directed upper flange and an inwardly directed lower flange, said inwardly directed upper flange positioning the raceway on the structural wall and said inwardly directed lower flange aligning the raceway on the structural wall.

7. A combination of a four-way cross unit for an electrical raceway wiring system and a structural wall, said four-way cross unit having four integral legs and each leg having an integral base member, upright exterior walls, and upright interior separator and depending facing comprising spaced-apart downwardly directed legs, said upright exterior walls being in a spaced-apart relationship with respect to each other and said upright interior separator being between the upright exterior walls, a channel on the inner upper surface of each upright exterior wall, a cap on the four-way cross unit, said cap having a base member and spaced-apart depending legs fitting with the said channel, the upright interior separator of each leg terminating at the junction of the four legs to provide a void space, said depending facing having on each leg an inwardly directed upper flange and an inwardly directed lower flange, and said upper flange positioning the raceway on the structural wall and said lower flange aligning the raceway on the structural wall.

8. A cornice end cap for an electrical raceway wiring system, comprising a main flat portion and a skirt on one side of the main flat portion, said main flat portion and said skirt being in the same plane, two spaced-apart legs projecting outwardly from the main flat portion and at an angle with the main flat portion, and said two spaced-apart legs defining a groove between themselves.

9. A flush end cap for an electrical raceway wiring system, said flush end cap comprising a flat base portion and a skirt on one side of the flat base portion, said flat base portion and said skirt being in the same plane, two spaced-apart legs on the face of said flat base portion, said spaced-apart legs extending from substantially one side of the flat base portion to substantially the skirt, and said two spaced legs defining a groove.

10. A system and circuit voltage separator unit for an electrical raceway wiring system, said unit having four exterior walls and a divider which divides the space defined by said walls into an upper half and a lower half, and each half being divided into quarters by two barrier strips which are substantially at right angles to each other and run from one exterior wall to the other exterior wall, breakaway knockouts in each exterior wall and adjacent each quarter to define a passageway into the quarter, breakaway knockouts in said barrier strips to define a passageway between adjacent quarters, and breakaway knockouts in the divider to define a passageway between the upper and the lower adjacent quarters.

11. A system and circuit voltage separator unit for an electrical raceway wiring system, said unit having four exterior walls, said exterior walls being united at their common adjacent edges to define a housing having open ends, a divider between said walls and between said open ends, said divider dividing the space defined by said walls into a first half and a second half, each half being divided into quarter units by two barrier strips which are substantially at right angles to each other and run from one exterior wall to the opposite exterior wall, each of said exterior walls on the free edge having a slot substantially at a right angle to the free edge of the wall, each of said barrier strips having a stud for fitting with said slot, breakaway knockouts in each exterior wall and adjacent each quarter unit to define a passageway into the quarter unit, breakaway knockouts in said barrier strips to define a passageway between the adjacent quarter units, and breakaway knockouts in the divider to define a passageway between the adjacent quarter units in the first half and the second half.

12. A circuit and system voltage separator unit for an electrical raceway wiring system, said unit having four exterior walls, said exterior walls being of flat stock and welded together at common adjacent edges to define a housing having open ends, a divider which divides the housing defined by said walls into a first half and a second half, and each half being divided into quarter units by two barrier strips which are substantially at right angles to each other and run from one exterior wall to the opposite exterior wall, horseshoe-type breakaway knockouts in each exterior wall and adjacent each quarter unit to define a free passageway into the quarter unit, breakaway knockouts in said barrier strips to define a passageway between adjacent quarter units, and breakaway knockouts in the divider to define a passageway between the adjacent quarter units of the first half and the second half.

13. A circuit and system voltage separator unit for an electrical raceway wiring system, said unit having four exterior walls, said four exterior walls composed of two pieces, each piece having two exterior walls and said two exterior walls of each piece being substantially at right angles to each other, on the free end of one exterior wall of said piece there being a male slide member and on the free end of the other wall of said piece there being a female slide member, said four exterior walls being united by having the male slide member in the first piece fitting with the female slide member in the second piece and having the male slide member in the second piece fitting with the female slide member in the first piece, a divider which divides the space defined by said walls into a first half and a second half, each half being divided into quarter units by two barrier strips which are substantially at right angles to each other and run from one exterior wall to the opposite exterior wall, breakaway knockouts in each exterior wall and adjacent each quarter unit to define a passageway into the quarter unit, breakaway knockouts in said barrier strips to define a passageway between adjacent quarter units, and breakaway knockouts in the divider to define a passageway between adjacent quarter units in the first half and the second half.

14. A circuit and system voltage separator unit for an electrical raceway wiring system, said unit having four exterior walls, said four exterior walls being composed of a first wall member having a first side and a second side and a second wall member having a first side and a second side, said first side of said first wall member having on its free end a male slide member and second side of said first wall member having on its free end a female slide member, said second wall member having on the free end of the first side a male slide member and having on the free end of the second side a female slide member, said four exterior walls being composed of the male slide member of the first wall member fitting with the female slide member of the second wall member and the female slide member of the first wall member fitting with the male slide member of the second wall member, a divider which divides the space defined by said walls into a first half and a second half, and each half being divided into quarter units by two barrier strips which are substantially at right angles to each other and run from one exterior wall to the opposite exterior wall, breakaway knockouts in each exterior wall and adjacent each quarter unit to define a passageway into the quarter unit, breakaway knockouts in the divider to define a passageway between adjacent quarter units of the first half and the second half.

15. A circuit and system voltage separator unit for an electrical raceway wiring system, said unit having four exterior walls, said four exterior walls being composed of a first wall member and a second wall member, said first and second wall members each having a first side and a second side with said first and second sides being substantially at right angles to each other, said first wall member having on the free end of the first side a male slide member and having on the free end of the second side a female slide member, said second wall member having on the free end of the first side a male slide member and having on the free end of the second side a female slide member, said first wall member and said second wall member being in an assembled position with the male slide member of the first side of the first wall member fitting with the female slide member of the second side of the second wall member and with the female slide member of the second side of the first wall member fitting with the male slide member of the first side of the second wall member, said four exterior walls defining a housing having free open ends, a divider which divides the space defined by said walls into a first half and a second half, and each half being divided into units by two barrier strips which are substantially at right angles to one another and run from one exterior wall to the other exterior wall, said exterior wall on the free edges having at approximately the midposition a slot for receiving said barrier strips, horseshoe shaped breakaway knockouts in each exterior wall and adjacent each quarter unit to define a passageway into the quarter unit, breakaway knockouts in said barrier strips to define the passageway between adjacent quarter units, and breakaway knockouts in the divider to define a passageway between adjacent quarter units in the first half and the second half.

16. The combination of an internal L-section for an electrical raceway wiring system and a structural wall, said internal L-section having a first leg and a second leg mating with each other at an angle, said first and second legs comprising an integral base member, upright exterior walls, an upright interior separator between the exterior walls, and depending facing comprising two spaced-apart downwardly directed legs, said upright exterior walls being in a spaced apart relationship and said upright interior separator being between said upright exterior walls, a channel on the upper inner edge of each upright exterior wall, a cap on said internal L-section, said cap having a base member and on the outer part of said base member depending legs fitting with the channels on the upper inner face of the upright exterior walls, on the inner upper face of the two spaced-apart downwardly directed legs there being an upper flange and a lower flange, said upper flange positioning the raceway on the structural wall and said lower flange aligning the raceway on the structural wall.

17. The combination of an external L-section for an electrical raceway wiring system and a structural wall, said external L-section having a first leg and a second leg mating with each other at an angle with the first and second legs having an integral base member, upright exterior walls, an upright interior separator, and depending facing comprising two spaced-apart downwardly directed legs, said upright exterior walls being in a spaced-apart relationship and said upright interior separator being between said upright exterior walls, a channel on the upper inner edge of each upright exterior wall, a cap on said external L-section, said cap having a base member and on the outer part of said base member depending legs fitting with the channels on the upper inner face of the upright exterior walls, on the inner upper face of the two spaced-apart downwardly directed legs there being an upper flange and a lower flange, said upper flange positioning the raceway on the structural wall and said lower flange aligning the raceway on the structural wall.

18. A system and circuit voltage separator unit for an electrical raceway wiring system, said unit having four exterior walls and a divider which divides the space defined by said walls into an upper half and a lower half and breakaway knockouts in each exterior wall, said four exterior walls defining a housing having open ends.

19. A system and circuit voltage separator unit for an electrical raceway wiring system, said unit having four exterior walls, said exterior walls being united at the common and adjacent edges so as to define a housing having open ends, a divider between said walls and between said open ends, said divider dividing the space defined between said walls into a first half and a second half, and breakaway knockouts in each exterior wall.

20. A system and circuit voltage separator unit for an electrical raceway wiring system, said unit having four exterior walls, said exterior walls being composed of two pieces, each piece having two exterior walls and the two exterior walls of each piece being substantially at right angles to each other, on the free end of one exterior wall of said piece there being a male slide member and on the free end of the other wall of said piece there being a female slide member, said four exterior walls being united by having the male slide member in the first piece fitting with the female slide member in the second piece, and having the male slide member in the second piece fitting with the female slide member in the first piece, a divider which divides the space defined by said walls into a first half and a second half, and breakaway knockouts in each exterior wall.

21. A T-section of an electrical raceway wiring system, said T-section comprising:
    (a) a leg member and a cross member;
    (b) said leg and cross members having an integral base, upright exterior walls and an upright interior separator;
    (c) said upright interior separator being positioned between the upright exterior walls to form a first cell for housing an electrical power line and a second cell for housing an electrical communication line;
    (d) said upright interior separator being discontinuous at the junction of the leg member and cross member to provide a void space;
    (e) an angle end cap on an end of the straight section; and
    (f) said angle end cap having an upright member and a base member with the base member having a slot fitting over the interior separator and with the upright member flush covering the ends of the first and second cells.

22. A T-section for an electrical raceway wiring system, said T-section comprising:
    (a) a leg member and a cross member;
    (b) said leg and cross members having an integral base, upright exterior walls and an upright interior separator;
    (c) said upright interior separator being positioned between the upright exterior walls to form a first cell for housing an electrical power line and a second cell for housing an electrical communication line;
    (d) said upright interior separator being discontinuous at the junction of the leg member and cross member to provide a void space;
    (e) a flush end cap on an end of the cross part of the T-section; and,
    (f) a flush end cap on the end of the leg of the T-section.

23. A T-section for an electrical raceway wiring system, said T-section comprising:
    (a) a leg member and a cross member;
    (b) said leg and cross members having an integral base, upright exterior walls and an upright interior separator;
    (c) said upright interior separator being positioned between the upright exterior walls to form a first cell for housing an electrical power line and a second cell for housing an electrical communication line;
    (d) said upright interior separator being discontinuous at the junction of the leg member and cross member to provide a void space;
    (e) a reversible voltage separator clip;
    (f) the interior separator being discontinuous at a place other than at the junction of the leg member and cross member for receiving said reversible voltage separator clip; and
    (g) said reversible voltage separator clip having two legs bridging the gap in the interior separator and an integral base member, with said base member being offset so as to be closer to one exterior wall than to the other exterior wall.

24. A T-section for an electrical raceway wiring system, said T-section comprising:
    (a) a leg member and a cross member;
    (b) said leg and cross members having an integral base, upright exterior walls and an upright interior separator;
    (c) said upright interior separator being positioned between the upright exterior walls to form a first cell for housing an electrical power line and a second cell for housing an electrical communication line;
    (d) said upright interior separator being discontinuous at the junction of the leg member and cross member to provide a void space;
    (e) a cornice end cap on an end of the T-section;
    (f) said cornice end cap comprising a main flat portion and a skirt on one side of the main flat portion;
    (g) said main flat portion and said skirt being in the same plane;
    (h) two spaced-apart legs projecting outwardly from the main flat portion and at an angle with the main flat portion; and
    (i) said two spaced-apart legs defining a groove between themselves and which groove fits with the interior separator.

25. A T-section for an electrical raceway wiring system, said T-section comprising:
    (a) a leg member and a cross member;
    (b) said leg and cross members having an integral base, upright exterior walls and an upright interior separator;
    (c) said upright interior separator being positioned between the upright exterior walls to form a first cell for housing an electrical power line and a second cell for housing an electrical communication line;
    (d) said upright interior separator being discontinuous at the junction of the leg member and cross member to provide a void space;
    (e) a raceway connector at one end of the T-section; and
    (f) said raceway connector comprising a base member and two upright legs for fitting with and between an exterior wall and the interior separator.

26. A T-section for an electrical raceway wiring system, said T-section comprising:
    (a) a leg member and a cross member;
    (b) said leg and cross members having an integral base, upright exterior walls and an upright interior separator;
    (c) said upright interior separtor being positioned between the upright exterior walls to form a first cell for housing an electrical power line and a second cell for housing an electrical communication line;
    (d) said upright interior separator being discontinuous at the junction of the leg member and cross member to provide a void space;
    (e) a system and voltage separator unit fitting in said void space;
    (f) said unit having four exterior walls and a divider which divides the space defined by said walls into an upper half and a lower half;
    (g) breakaway knockouts in each exterior wall; and
    (h) said unit having open ends.

27. A T-section of an electrical raceway wiring system, said T-section comprising:
    (a) a leg member and a cross member;

(b) said leg and cross members having an integral base, upright exterior walls and an upright interior separator;
(c) said upright interior separator being positioned between the upright exterior walls to form a first cell for housing an electrical power line and a second cell for housing an electrical communication line;
(d) said upright interior separator being discontinuous at the junction of the leg member and cross member to provide a void space;
(e) a system and voltage separator unit fitting in said void space;
(f) said unit having four exterior walls;
(g) said exterior walls being united at the common and adjacent edges so as to define a housing having open ends;
(h) a divider between said walls and between said open ends;
(i) said divider dividing the space defined between said walls into a first half and a second half; and
(j) breakaway knockouts in each exterior wall.

28. A four-way cross unit for an electrical raceway wiring system, said four-way cross unit comprising:
(a) four legs;
(b) said legs having an integral and unitary base member, upright exterior walls and an upright exterior separator;
(c) said upright exterior walls being in a spaced-apart relationship with respect to each other and said upright interior separator being positioned between said upright exterior walls to form a first cell for housing an electrical power line and a second cell for housing an electrical communication line;
(d) the upright exterior separator for each leg terminating at the junction of each leg in the four-way cross unit to provide a void space;
(e) an angle end cap on an end of the four-way cross unit; and
(f) said angle end cap having an upright member and a base member with the base member having a slot fitting over the interior separator and with the upright member flush covering the ends of the first and second cells.

29. A four-way cross unit for an electrical raceway wiring system, said four-way cross unit comprising:
(a) four legs;
(b) said legs having an integral and unitary base member, upright exterior walls and an upright interior separator;
(c) said upright exterior walls being in a spaced-apart relationship with respect to each other and said upright interior separator being positioned between said upright exterior walls to form a first cell for housing an electrical power line and a second cell for housing an electrical communication line;
(d) the upright exterior separator for each leg terminating at the junction of each leg in the four-way cross unit to provide a void space;
(e) a flush end cap on an end of the four-way cross unit; and
(f) a flush end cap on another end of the four-way cross unit.

30. A four-way cross unit for an electrical raceway wiring system, said four-way cross unit comprising:
(a) four legs;
(b) said legs having an integral and unitary base member, upright exterior walls and an upright interior separator;
(c) said upright exterior walls being in a spaced-apart relationship with respect to each other and said upright interior separator being positioned between said upright exterior walls to form a first cell for housing an electrical power line and a second cell for housing an electrical communication line;
(d) the upright exterior separator for each leg terminating at the junction of each leg in the four-way cross unit to provide a void space;
(e) a reversible voltage separator clip;
(f) the interior separator being discontinuous at a place other than at the junction of the leg member and cross member for receiving said reversible voltage separator clip; and,
(g) said reversible voltage separator clip having two legs bridging the gap in the interior separator and an intergral base member, with said base member being offset so as to be closer to one exterior wall than to the other exterior wall.

31. A four-way cross unit for an electrical raceway wiring system, said four-way cross unit comprising:
(a) four legs;
(b) said legs having an integral and unitary base member, upright exterior walls and an upright interior separator;
(c) said upright exterior walls being in a spaced-apart relationship with respect to each other and said upright interior separator being positioned between said upright exterior walls to form a first cell for housing an electrical power line and a second cell for housing an electrical communication line;
(d) the upright exterior separator for each leg terminating at the junction of each leg in the four-way cross unit to provide a void space;
(e) a cornice end cap on an end of the four-way cross unit;
(f) said cornice end cap comprising a main flat portion and a skirt on one side of the main flat portion;
(g) said main flat portion and said skirt being in the same plane;
(h) two spaced-apart legs projecting outwardly from the main flat portion and at an angle with the main flat portion; and
(i) said two spaced-apart legs defining a groove between themselves and which groove fits with the interior separator.

32. A four-way cross unit for an electrical raceway wiring system, said four-way cross unit comprising:
(a) four legs;
(b) said legs having an integral and unitary base member, upright exterior walls and an upright interior separator;
(c) said upright exterior walls being in a spaced-apart relationship with respect to each other and said upright interior separator being positioned between said upright exterior walls to form a first cell for housing an electrical power line and a second cell for housing an electrical communication line;
(d) the upright exterior separator for each leg terminating at the junction of each leg in the four-way cross unit to provide a void space;
(e) a raceway connector at one end of the T-section; and
(f) said raceway connector comprising a base member and two upright legs for fitting with and between an exterior wall and the interior separator.

33. A four-way cross unit for an electrical raceway wiring system, said four-way cross unit comprising:
(a) four legs;
(b) said legs having an integral and unitary base member, upright exterior walls and an upright interior separator;
(c) said upright exterior walls being in a spaced-apart relationship with respect to each other and said upright interior separator being positioned between said upright exterior walls to form a first cell for housing an electrical power line and a second cell for housing an electrical communication line;
(d) the upright exterior separator for each leg terminating at the junction of each leg in the four-way cross unit to provide a void space;

(e) a system and voltage separator unit fitting in said void space;
(f) said unit having four exterior walls and a divider which divides the space defined by said walls into an upper half and a lower half;
(g) breakaway knockouts in each exterior wall; and
(h) said unit having open ends.

34. A four-way cross unit for an electrical raceway wiring system, said four-way cross unit comprising:
(a) four legs;
(b) said legs having an integral and unitary base member, upright exterior walls and an upright interior separator;
(c) said upright exterior walls being in a spaced-apart relationship with respect to each other and said upright interior separator being positioned between said upright exterior walls to form a first cell for housing an electrical power line and a second cell for housing an electrical communication line;
(d) the upright exterior separator for each leg terminating at the junction of each leg in the four-way cross unit to provide a void space;
(e) a system and voltage separator unit fitting in said void space;
(f) said unit having four exterior walls;
(g) said exterior walls being united at the common and adjacent edges so as to define a housing having open ends;
(h) a divider between said walls and between said open ends;
(i) said divider dividing the space defined between said walls into a first half and a second half; and
(j) breakaway knockouts in each exterior wall.

35. A cornice end cap for an electrical raceway wiring system, comprising a main flat portion and a skirt on one side of the main flat portion, said main flat portion and said skirt being in the same plane, two spaced-apart legs projecting outwardly from the main flat portion and at approximately a right angle with the main flat portion, said two spaced-apart legs defining a groove between themselves, and there being a passageway in each leg.

36. A flush end cap for an electrical raceway wiring system, said flush end cap comprising a flat base portion and a skirt on one side of the flat base portion, said flat base portion and said skirt being in the same plane, two spaced-apart legs on the face of said flat base portion, said spaced-apart legs extending from substantially one side of the flat base portion to substantially the skirt, said two spaced-apart legs defining a groove, and said skirt being narrower in width than said flat base portion.

37. A flush end cap for an electrical raceway wiring system, said flush end cap comprising a flat base portion and a skirt on one side of the flat base portion, said flat base portion and said skirt being in the same plane, two spaced-apart legs on the face of said flat base portion, said spaced-apart legs extending from substantially one side of the flat base portion to substantially the skirt, said two spaced-apart legs defining a groove, and there being a passageway in said skirt.

38. A reversible voltage separator clip for an electrical raceway system, said clip having a base member, two outwardly directed legs, said two legs being directed outwardly from the same side of the base member, a clevis on each end of the outwardly directed legs and said clevis being parallel with the base member, and the length of said clevis being substantially equal to the width of the clip.

39. A reversible voltage separator clip for an electrical raceway wiring system, said clip having a base member, an outwardly directed leg on each end of the base member, said outwardly directed legs being positioned on the same side of the base member, on each end of the outwardly directed leg another leg parallel to the base member, each leg parallel to the base member having an internal slotted section on its free end, and the length of said internal slotted section being substantially equal to the width of the clip.

40. A straight section for an electrical raceway wiring system, said straight section comprising:
(a) a continuous base;
(b) exterior walls;
(c) an interior separator;
(d) said base, exterior walls and interior separator being integral;
(e) said exterior walls being in a spaced-apart relationship;
(f) said interior separator being positioned between said exterior walls;
(g) said exterior walls and interior separator forming a first cell and a second cell for housing an electrical power line in the first cell and an electrical communication line in the second cell;
(h) an angle end cap on an end of the straight section; and
(i) said angle end cap having an upright member and a base member with the base member having a slot fitting over the interior separator and with the upright member flush covering the ends of the first and second cells.

41. A straight section for an electrical raceway wiring system, said straight section comprising:
(a) a continuous base;
(b) exterior walls;
(c) an interior separator;
(d) said base, exterior walls and interior separator being integral;
(e) said exterior walls being in a spaced-apart relationship;
(f) said interior separator being positioned between said exterior walls;
(g) said exterior walls and interior separator forming a first cell and a second cell for housing an electrical power line in the first cell and an electrical communication line in the second cell;
(h) a flush end cap on an end of the straight section; and
(i) said flush end cap having a base member and a keyway on the internal face of the base member fitting with the interior separator to flush cover the ends of the first and second cells.

42. A straight section for an electrical raceway wiring system, said straight section comprising:
(a) a continuous base;
(b) exterior walls;
(c) an interior separator;
(d) said base, exterior walls and interior separator being integral;
(e) said exterior walls being in a spaced-apart relationship;
(f) said interior separator being positioned between said exterior walls;
(g) said exterior walls and interior separator forming a first cell and a second cell for housing an electrical power line in the first cell and an electrical communication line in the second cell;
(h) a reversible voltage separator clip;
(i) the interior separator being discontinuous for receiving a reversible voltage separator clip; and
(j) said reversible voltage separator clip having two legs bridging the gap in the interior separator and an integral base member, with said base member being offset so as to be closer to one exterior wall than to the other exterior wall.

43. A straight section for an electrical raceway wiring system, said straight section comprising:
(a) a continuous base;
(b) exterior walls;
(c) an interior separator;
(d) said base, exterior walls and interior separator being integral;

(e) said exterior walls being in a spaced-apart relationship;
(f) said interior separator being positioned between said exterior walls;
(g) said exterior walls and interior separator forming a first cell and a second cell for housing an electrical power line in the first cell and an electrical communication line in the second cell;
(h) a cornice end cap on an end of the straight section;
(i) said cornice end cap comprising a main flat portion and a skirt on one side of the main flat portion;
(j) said main flat portion and said skirt being in the same plane;
(k) two spaced-apart legs projecting outwardly from the main flat portion and at an angle with the main flat portion; and
(l) said two spaced-apart legs defining a groove between themselves and which groove fits with the interior separator.

44. A straight section for an electrical raceway wiring system, said straight section comprising:
(a) a continuous base;
(b) exterior walls;
(c) an interior separator;
(d) said base, exterior walls and interior separator being integral;
(e) said exterior walls being in a spaced-apart relationship;
(f) said interior separator being positioned between said exterior walls;
(g) said exterior walls and interior separator forming a first cell and a second cell for housing an electrical power line in the first cell and an electrical communication line in the second cell;
(h) a raceway connector at one end of the straight section; and
(i) said raceway connector comprising a base member and two upright legs for fitting with and between an exterior wall and the interior separator.

45. An L-section for an electrical raceway wiring system, said L-section comprising:
(a) said L-section having a first leg and a second leg with the legs being at an angle to each other;
(b) each of said legs having a continuous base, exterior walls and an interior separator;
(c) said base, exterior walls and interior separator being integral;
(d) said exterior walls being in a spaced-apart relationship;
(e) said interior separator being positioned between said exterior walls;
(f) said exterior walls and interior separator forming a first cell and a second cell for housing an electrical power line in the first cell and an electrical communication line in the second cell;
(g) an angle end cap on an end of the L-section; and
(h) said angle end cap having an upright member and a base member with the base member having a slot fitting over the interior separator and with the upright member flush covering the ends of the first and second cells.

46. An L-section for an electrical raceway wiring system, said L-section comprising:
(a) said L-section having a first leg and a second leg with the legs being at an angle to each other;
(b) each of said legs having a continuous base, exterior walls and an interior separator;
(c) said base, exterior walls and interior separator being integral;
(d) said exterior walls being in a spaced-apart relationship;
(e) said interior separator being positioned between said exterior walls;
(f) said exterior walls and interior separator forming a first cell and a second cell for housing an electrical power line in the first cell and an electrical communication line in the second cell;
(g) a flush end cap on an end of the straight section; and
(h) said flush end cap having a base member and a keyway on the internal face of the base member fitting with the interior separator to flush cover the ends of the first and second cells.

47. An L-section for an electrical raceway wiring system, said L-section comprising:
(a) said L-section having a first leg and a second leg with the legs being at an angle to each other;
(b) each of said legs having a continuous base, exterior walls and an interior separator;
(c) said base, exterior walls and interior separator being integral;
(d) said exterior walls being in a spaced-apart relationship;
(e) said interior separator being positioned between said exterior walls;
(f) said exterior walls and interior separator forming a first cell and a second cell for housing an electrical power line in the first cell and an electrical communication line in the second cell;
(g) a reversible voltage separator clip;
(h) the interior separator being discontinuous for receiving a reversible voltage separator clip; and
(i) said reversible voltage separator clip having two legs bridging the gap in the interior separator and an integral base member, with said base member being offset so as to be closer to one exterior wall than to the other exterior wall.

48. An L-section for an electrical raceway wiring system, said L-section comprising:
(a) said L-section having a first leg and a second leg with the legs being at an angle to each other;
(b) each of said legs having a continuous base, exterior walls and an interior separator;
(c) said base, exterior walls and interior separator being integral;
(d) said exterior walls being in a spaced-apart relationship;
(e) said interior separator being positioned between said exterior walls;
(f) said exterior walls and interior separator forming a first cell and a second cell for housing an electrical power line in the first cell and an electrical communication line in the second cell;
(g) a raceway connector at one end of the L-section; and
(h) said raceway connector comprising a base member and two upright legs for fitting with and between an exterior wall and the interior separator.

49. An internal L-section for an electrical raceway wiring system, said internal L-section comprising:
(a) a first leg and a second leg mating with each other at an angle;
(b) the first and second legs having an integral and continuous base and inside upright exterior walls and an inside upright interior separator forming a first cell and a second cell for housing an electrical power line in the first cell and an electrical communication line in the second cell;
(c) an angle end cap on an end of the internal L-section; and
(d) said angle end cap having an upright member and a base member with the base member having a slot fitting over the interior separator and with the upright member flush covering the ends of the first and second cells.

50. An internal L-section for an electrical raceway wiring system, said internal L-section comprising:
(a) a first leg and a second leg mating with each other at an angle;

(b) the first and second legs having an integral and continuous base and inside upright exterior walls and an inside upright interior separator forming a first cell and a second cell for housing an electrical power line in the first cell and an electrical communication line in the second cell;
(c) a flush end cap on an end of the internal L-section; and
(d) said flush end cap having a base member and a keyway on the internal face of the base member fitting with the interior separator to flush cover the ends of the first and second cells.

51. An internal L-section for an electrical raceway wiring system, said internal L-section comprising:
(a) a first leg and a second leg mating with each other at an angle;
(b) the first and second legs having an integral and continuous base and inside upright exterior walls and an inside upright interior separator forming a first cell and a second cell for housing an electrical power line in the first cell and an electrical communication line in the second cell;
(c) a reversible voltage separator clip;
(d) the interior separator being discontinuous for receiving a reversible voltage separator clip; and
(e) said reversible voltage separator clip having two legs bridging the gap in the interior separator and an an integral base member, with said base member being offset so as to be closer to one exterior wall than to the other exterior wall.

52. An internal L-section for an electrical raceway wiring system, said internal L-section comprising:
(a) a first leg and a second leg mating with each other at an angle;
(b) the first and second legs having an integral and continuous base and inside upright exterior walls and an inside upright interior separator forming a first cell and a second cell for housing an electrical power line in the first cell and an electrical communication line in the second cell;
(c) a cornice end cap on an end of the internal L-section;
(d) said cornice end cap comprising a main flat portion and a skirt on one side of the main flat portion;
(e) said main flat portion and said skirt being in the same plane;
(f) two spaced-apart legs projecting outwardly from the main flat portion and at an angle with the main flat portion; and
(g) said two spaced-apart legs defining a groove between themselves and which groove fits with the interior separator.

53. An internal L-section for an electrical raceway wiring system, said internal L-section comprising:
(a) a first leg and a second leg mating with each other at an angle;
(b) the first and second legs having an integral and continuous base and inside upright exterior walls and an inside upright interior separator forming a first cell and a second cell for housing an electrical power line in the first cell and an electrical communication line in the second cell;
(c) a raceway conector at one end of the internal L-section; and
(d) said raceway connector comprising a base member and two upright legs for fitting with and between an exterior wall and the interior separator.

54. An external L-section for an electrical raceway wiring system, said external L-section comprising:
(a) a first leg and a second leg mating with each other at an angle;
(b) the first and second legs havig an integral and continuous base and outside upright exterior walls and an outside upright interior separator forming a first cell and a second cell for housing an electrical power line in the first cell and an electrical communication line in the second cell;
(c) an angle end cap on an end of the external L-section; and
(d) said angle end cap having an upright member and a base member with the base member having a slot fitting over the interior separator and with the upright member flush covering the ends of the first and second cells.

55. An external L-section for an electrical raceway wiring system, said external L-section comprising:
(a) a first leg and a second leg mating with each other at an angle;
(b) the first and second legs having an integral and continuous base and outside upright exterior walls and an outside upright interior separator forming a first cell and a second cell for housing an electrical power line in the first cell and an electrical communication line in the second cell;
(c) a flush end cap on an end of the external L-section; and
(d) said flush end cap having a base member and keyway on the internal face of the base member fitting with the interior separator to flush cover the ends of the first and second cells.

56. An external L-section for an electrical raceway wiring system, said external L-section comprising:
(a) a first leg and a second leg mating with each other at an angle;
(b) the first and second legs having an integral and continuous base and outside upright exterior walls and an outside upright interior separator forming a first cell and a second cell for housing an electrical power line in the first cell and an electrical communication line in the second cell;
(c) a reversible voltage separator clip;
(d) the interior separator being discontinuous for receiving a reversible voltage separator clip; and
(e) said reversible voltage separator clip having two legs bridging the gap in the interior separator and an integral base member, with said base member being offset so as to be closer to one exterior wall than to the other exterior wall.

57. An external L-section for an electrical raceway wiring system, said external L-section comprising:
(a) a first leg and a second leg mating with each other at an angle;
(b) the first and second legs having an integral and continuous base and outside upright exterior walls and an outside upright interior separator forming a first cell and a second cell for housing an electrical power line in the first cell and an electrical communication line in the second cell;
(c) a cornice end cap on an end of the external L-section;
(d) said cornice end cap comprising a main flat portion and a skirt on one side of the main flat portion;
(e) said main flat portion and said skirt being in the same plane;
(f) two spaced-apart legs projecting outwardly from the main flat portion and at an angle with the main flat portion; and
(g) said two spaced-apart legs defining a groove between themselves and which groove fits with the interior separator.

58. An external L-section for an electrical raceway wiring system, said external L-section comprising:
(a) a first leg and a second leg mating with each other at an angle;
(b) the first and second legs having an integral and continuous base and outside upright exterior walls and an outside upright interior separator forming a first cell and a second cell for housing an electrical power line in the first cell and electrical communication line in the second cell;

(c) a raceway connector at one end of the external L-section; and
(d) said raceway connector comprising a base member and two upright legs for fitting with and between an exterior wall and the interior separator.

59. An L-section for an electrical raceway wiring system, said L-section comprising:
(a) said L-section having a first leg and a second leg with the legs being at an angle to each other;
(b) each of said legs having a continuous base, exterior walls and an interior separator;
(c) said base, exterior walls and interior separator being integral;
(d) said exterior walls being in a spaced-apart relationship;
(e) said interior separator being positioned between said exterior walls;
(f) said exterior walls and interior separator forming a first cell and a second cell for housing an electrical power line in the first cell and an electrical communication line in the second cell;
(g) a cornice end cap on an end of the L-section;
(h) said cornice end cap comprising a main flat portion and a skirt on one side of the main flat portion;
(i) said main flat portion and said skirt being in the same plane;
(j) two spaced-apart legs projecting outwardly from the main flat portion and at an angle with the main flat portion; and
(k) said two spaced-apart legs defining a groove between themselves and which groove fits with the interior separator.

References Cited

UNITED STATES PATENTS

| | | | |
|---|---|---|---|
| 1,132,671 | 3/1915 | Murray | 174—72 |
| 1,979,804 | 11/1934 | Lutz | 174—68 X |
| 2,079,635 | 5/1937 | Sharp | 50—126 X |
| 2,489,956 | 11/1949 | Crook | 174—68 X |
| 2,930,504 | 3/1960 | Hudson | 174—48 X |
| 2,956,587 | 10/1960 | Fisher | 174—68 X |
| 405,576 | 6/1889 | Lynch | 138—117 |
| 1,437,324 | 11/1922 | Tashjian | 174—49 |
| 2,073,490 | 3/1937 | Lewin. | |
| 2,250,276 | 7/1941 | Rutherford et al. | 174—101 X |
| 2,374,622 | 4/1945 | Rugg | 174—58 |
| 2,684,220 | 7/1954 | Beber et al. | 174—57 X |
| 2,887,525 | 5/1959 | Lewus | 174—65 X |
| 674,560 | 4/1901 | Ill | 220—27 X |
| 2,028,509 | 1/1936 | Knell | 220—27 X |

FOREIGN PATENTS

| | | |
|---|---|---|
| 191,491 | 8/1957 | Austria. |
| 194,946 | 1/1958 | Austria. |
| 1,089,607 | 3/1955 | France. |
| 712,618 | 7/1931 | France. |
| 837,674 | 11/1938 | France. |
| 899,545 | 8/1944 | France. |
| 1,045,430 | 6/1953 | France. |
| 523,440 | 7/1940 | Great Britain. |
| 583,424 | 12/1946 | Great Britain. |
| 440,700 | 10/1948 | Italy. |
| 609,943 | 10/1960 | Italy. |
| 611,641 | 10/1960 | Italy. |

OTHER REFERENCES

Wiremold, Catalog and Wiring Guide No. 18, Apr. 11, 1957, p. 79.

H&B Standard Aluminum Movable Partition, Mar. 15, 1955, p. 14, right-hand figure of section of base.

LARAMIE E. ASKIN, Primary Examiner

U.S. Cl. X. R.

52—221; 138—115; 174—65, 72, 97, 101; 220—3.94, 27